US012652657B2

(12) United States Patent
Luo et al.

(10) Patent No.: US 12,652,657 B2
(45) Date of Patent: Jun. 9, 2026

(54) METHOD PERFORMED BY USER EQUIPMENT, AND USER EQUIPMENT

(71) Applicant: SHARP KABUSHIKI KAISHA, Sakai City (JP)

(72) Inventors: Chao Luo, Shanghai (CN); Yinan Zhao, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 294 days.

(21) Appl. No.: 18/284,737

(22) PCT Filed: Apr. 1, 2022

(86) PCT No.: PCT/CN2022/084773
§ 371 (c)(1),
(2) Date: Sep. 28, 2023

(87) PCT Pub. No.: WO2022/206948
PCT Pub. Date: Oct. 6, 2022

(65) Prior Publication Data
US 2024/0188048 A1     Jun. 6, 2024

(30) Foreign Application Priority Data
Apr. 2, 2021   (CN) .......................... 202110364947.0

(51) Int. Cl.
*H04W 72/0446*     (2023.01)
*H04W 72/25*       (2023.01)
(52) U.S. Cl.
CPC ....... *H04W 72/0446* (2013.01); *H04W 72/25* (2023.01)

(58) Field of Classification Search
USPC ....... 370/229, 230, 236, 252, 311, 328, 329, 370/330, 347, 458
See application file for complete search history.

(56) References Cited

U.S. PATENT DOCUMENTS

2021/0153231 A1* 5/2021 Yeo ................... H04W 72/0446
2022/0116927 A1* 4/2022 Wang ................... H04W 72/20
(Continued)

OTHER PUBLICATIONS

LG Electronics, "WID revision: NR sidelink enhancement", RP-201385, 3GPP TSG RAN Meeting #88e, Electronic Meeting, Jun. 29-Jul. 3, 2020.
(Continued)

*Primary Examiner* — Nguyen H Ngo
(74) *Attorney, Agent, or Firm* — ScienBiziP, P.C.

(57) ABSTRACT

Provided in the present invention are a method performed by user equipment, and user equipment. The method performed by user equipment includes: determining an inter-UE coordination message, wherein the message includes type-1 time resource indication values (TRIVs), the number of which is expression I, and type-2 TRIVs, the number of which is expression II, and the type-1 TRIVs and the type-2 TRIVs are used to indicate slot offset values, the number of which is expression III; and transmitting the inter-UE coordination message. If expression III is an even number, then expression I=expression III/2, and expression II=0, and if expression III is an odd number, then expression I=expression IV, and expression II=1, wherein one type-1 TRIV can indicate one slot offset, and one type-2 TRIV can indicate two slot offsets.

3 Claims, 1 Drawing Sheet

Determine contents of a second-stage sidelink control information (SCI) format for indication of either a set of preferred resources or a set of non-preferred resources, wherein the second-stage SCI format indicates two time resource indicator values (TRIVs), each TRIV indicates a number of slot(s) ($m_1$) that is less than or equal to two slots, each slot being indicated as a slot offset with respect to a reference slot of each TRIV, and the reference slot of a first TRIV of the two TRIVs is indicated in the second-stage SCI format — S101

Transmit the inter-UE coordination message — S103

(56) References Cited

U.S. PATENT DOCUMENTS

| | | | | | |
|---|---|---|---|---|---|
| 2022/0232626 A1* | 7/2022 | Li | .......................... | H04W 72/02 |
| 2022/0287086 A1* | 9/2022 | Hwang | ................. | H04W 76/14 |
| 2022/0322230 A1* | 10/2022 | Ye | .......................... | H04L 1/1893 |

OTHER PUBLICATIONS

LG Electronics et al., "New WID on 5G V2X with NR sidelink", RP-190766, 3GPP TSG RAN Meeting #83, Shenzhen, China, Mar. 18-21, 2019.
NTT Docomo, Inc., "New WID on New Radio Access Technology", RP-170855, 3GPP TSG RAN Meeting #75, Dubrovnik, Croatia, Mar. 6-9, 2017.
Huawei et al., "New WID on 3GPP V2X Phase 2", RP-170798, 3GPP TSG RAN Meeting #75, Dubrovnik, Croatia, Mar. 6-9, 2017.
LG Electronics et al., "New WI proposal: Support for V2V services based on LTE sidelink", RP-152293, 3GPP TSG RAN Meeting #70, Sitges, Spain, Dec. 7-10, 2015.

* cited by examiner

Determine contents of a second-stage sidelink
control information (SCI) format for indication
of either a set of preferred resources or a set of
non-preferred resources, wherein the second-stage
SCI format indicates two time resource indicator
values (TRIVs), each TRIV indicates a number of
slot(s) ($m_1$) that is less than or equal to two slots,
each slot being indicated as a slot offset with
respect to a reference slot of each TRIV, and the
reference slot of a first TRIV of the two TRIVs
is indicated in the second-stage SCI format

S101

Transmit the inter-UE coordination message

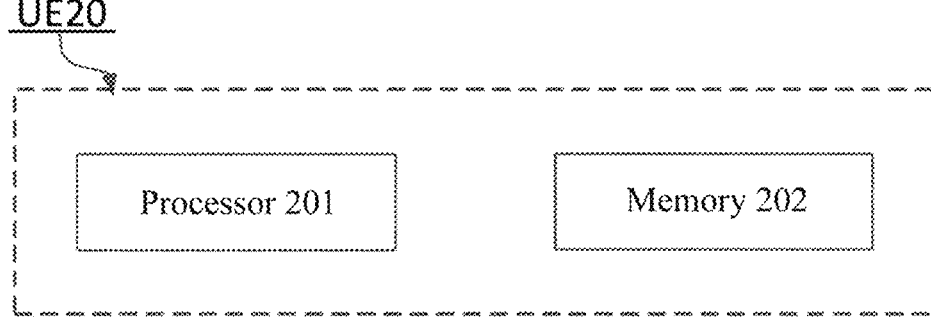

UE20

Processor 201          Memory 202

FIG. 2

METHOD PERFORMED BY USER EQUIPMENT, AND USER EQUIPMENT

TECHNICAL FIELD

The present invention relates to a method performed by user equipment, and user equipment.

BACKGROUND

SL communication (e.g., when SL resource allocation mode 2 is configured) can support inter-UE coordination functions, e.g., coordination of resource (e.g., SL resources) allocation between two or more UEs. For the inter-UE coordination functions, problems such as definition, transmission, reception, etc., of inter-UE coordination messages need to be solved.

PRIOR ART DOCUMENTS

Non-Patent Documents

Non-Patent Document 1: RP-152293, New WI proposal: Support for V2V services based on LTE sidelink
Non-Patent Document 2: RP-170798, New WID on 3GPP V2X Phase 2
Non-Patent Document 3: RP-170855, New WID on New Radio Access Technology
Non-Patent Document 4: RP-190766, New WID on 5G V2X with NR sidelink
Non-Patent Document 5: RP-201385, WID revision: NR sidelink enhancement

SUMMARY

In order to solve at least some of the above problems, provided in the present invention are a method performed by user equipment and user equipment. Thus, according to Embodiment 1, provided in the present invention is a method in which slots in an input slot offset set are dynamically mapped to several time resource indication values, and a reference time is reset for each time resource indication value, thereby achieving flexible and efficient time resource indication in an inter-UE coordination message.

According to the present invention, provided is a method performed by user equipment, characterized by comprising: determining an inter-UE coordination message comprising $$N_{co,tv,1}^{SL}$$

type-1 time resource indication values (TRIVs) and $$N_{co,tv,2}^{SL}$$

type-2 TRIVs, the type-1 TRIVs and the type-2 TRIVs being used to indicate $$N_{in}^{SL}$$

slot offset values; and transmitting the inter-UE coordination message. If $$N_{in}^{SL}$$

is an even number, then $$N_{co,tv,1}^{SL} = N_{in}^{SL}/2 \text{ and } N_{co,tv,2}^{SL} = 0,$$

and if $$N_{in}^{SL}$$

is an odd number, then $$N_{co,tv,1}^{SL} = \lfloor N_{in}^{SL}/2 \rfloor \text{ and } N_{co,tv,2}^{SL} = 1,$$

wherein one type-1 TRIV can indicate one slot offset, and one type-2 TRIV can indicate two slot offsets.

In addition, according to the present invention, proposed is user equipment, comprising: a processor; and a memory having instructions stored therein, wherein the instructions, when run by the processor, perform the aforementioned method.

Hence, provided in the present invention is a method, and according to Embodiment 1, provided in the present invention is a method in which slots in an input slot offset set are dynamically mapped to several time resource indication values, and a reference time is reset for each time resource indication value, thereby achieving flexible and efficient time resource indication in an inter-UE coordination message.

BRIEF DESCRIPTION OF THE DRAWINGS

The above and other features of the present invention will be more apparent from the following detailed description taken in conjunction with the accompanying drawings, in which:

FIG. 1 is a flowchart showing a method performed by user equipment according to Embodiment 1 of the present invention.

FIG. 2 shows a block diagram of user equipment (UE) according to the present invention.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following embodiments but is applicable to many other wireless communication systems, such as a communication system after 5G and a 4G mobile communication system before 5G.

Some terms involved in the present invention are described below. Unless otherwise specified, the terms involved in the present invention adopt the definitions herein. The terms provided in the present invention may vary in LTE, LTE-Advanced, LTE-Advanced Pro, NR, and subsequent communication systems, but unified terms are used in the present invention. When applied to a specific system, these terms can be replaced with terms used in the corresponding system.

3GPP: 3rd Generation Partnership Project
AGC: Automatic Gain Control
AMF: Access and Mobility Management Function
AS: Access Stratum
BWP: Bandwidth Part
CBR: Channel Busy Ratio
CP: Cyclic Prefix
CP-OFDM: Cyclic Prefix Orthogonal Frequency Division Multiplexing
CRB: Common Resource Block
CSI: Channel-State Information
DFT-s-OFDM: Discrete Fourier Transformation Spread Orthogonal Frequency Division Multiplexing
DL: Downlink
DM-RS: also referred to as DMRS, Demodulation Reference Signal
eNB: E-UTRAN Node B
E-UTRAN: Evolved UMTS Terrestrial Radio Access Network
FDRA: Frequency Domain Resource Assignment
FR1: Frequency Range 1
FR2: Frequency Range 2
GLONASS: GLObal NAvigation Satellite System
gNB: NR Node B
GNSS: Global Navigation Satellite System
GPS: Global Positioning System
HARQ: Hybrid Automatic Repeat Request
HARQ-ACK: HARQ Acknowledgement
ID: Identity (or Identifier)
IE: Information Element
LSB: Least Significant Bit
LTE: Long Term Evolution
LTE-A: Long Term Evolution-Advanced
MAC: Medium Access Control
MAC CE: MAC Control Element
MIB: Master Information Block
MIB-SL: Master Information Block-Sidelink
MIB-SL-V2X: Master Information Block-Sidelink-Vehicle to Everything
MIB-V2X: Master Information Block-Vehicle to Everything
MME: Mobility Management Entity
MSB: Most Significant Bit
NAS: Non-Access Stratum
NDI: New Data Indicator
NR: "New Radio", fifth generation radio access technology
OFDM: Orthogonal Frequency Division Multiplexing
P2V: Pedestrian-to-Vehicle
P2X: Pedestrian-to-Everything
PBCH: Physical Broadcast Channel
PDCCH: Physical Downlink Control Channel PDCP: Packet Data Convergence Protocol
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSS-SL: Primary Synchronization Signal for Sidelink
PSSS: Primary Sidelink Synchronization Signal
QZSS: Quasi-Zenith Satellite System
RB: Resource Block
RBG: Resource Block Group
RE: Resource Element
RLC: Radio Link Control
RRC: Radio Resource Control
RV: Redundancy Version
S-BWP: Sidelink Bandwidth Part
S-MIB: Sidelink Master Information Block
S-PSS: Sidelink Primary Synchronization Signal
S-SSB: Sidelink SS/PBCH Block (Sidelink Synchronization Signal/Physical Broadcast Channel Block)
S-SSS: Sidelink Secondary Synchronization Signal
SCI: Sidelink Control Information
SCS: Subcarrier Spacing
SIB: System Information Block
SL: Sidelink
SL BWP: Sidelink Bandwidth Part
SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SL-SCH: Sidelink Shared Channel
SLSS: Sidelink Synchronization Signal
SLSS ID: Sidelink Synchronization Signal Identity (or Sidelink Synchronization Signal Identifier)
SLSSID: Sidelink Synchronization Signal Identity (or Sidelink Synchronization Signal Identifier)
SSB: SS/PBCH Block (Synchronization Signal/Physical Broadcast Channel Block)
SSB-SL: SS/PBCH Block for Sidelink (Sidelink Synchronization Signal/Physical Broadcast Channel Block)
SSS: Secondary Synchronization Signal
SSS-SL: Secondary Synchronization Signal for Sidelink
SSSB: Sidelink SS/PBCH Block (Sidelink Synchronization Signal/Physical Broadcast Channel Block)
SSSS: Secondary Sidelink Synchronization Signal
Sub-channel: Sub-channel
S-GW: Serving Gateway
TB: Transport Block
UE: User Equipment
UL: Uplink
UMTS: Universal Mobile Telecommunications System
UPF: User Plane Function
V2I: Vehicle-to-Infrastructure
V2N: Vehicle-to-Network
V2P: Vehicle-to-Pedestrian
V2V: Vehicle-to-Vehicle
V2X: Vehicle-to-Everything
VRB: Virtual Resource Block Unless otherwise specified, in all embodiments and implementations of the present invention:

Optionally, "the first slot in the slot set S later than the slot n" refers to the first slot that is in the slot set S and that is temporally later than the slot n. The slot n may be in the slot set S, or may not be in the slot set S. For example, if the slot set S={1, 3, 5}, and the slot n=2, then the first slot in the slot set S later than the slot n is the slot 3. As another example, if the slot set S={ 1, 3, 5}, and the slot n=3, then the first slot in the slot set S later than the slot n is the slot 5.

Optionally, "the first slot in the slot set S not earlier than the slot n" refers to the first slot that is in the slot set S and that is temporally not earlier than the slot n. The slot n may be in the slot set S, or may not be in the slot set S. For example, if the slot set S={1, 3, 5}, and the slot n=2, then the first slot in the slot set S not earlier than the slot n is the slot 3. As another example, if the slot set S={1, 3, 5}, and the slot n=3, then the first slot in the slot set S not earlier than the slot n is the slot 3.

Optionally, "the last slot in the slot set S earlier than the slot n" refers to the last slot that is in the slot set S and that is temporally earlier than the slot n. The slot n may be in the slot set S, or may not be in the slot set S. For example, if the slot set S={1, 3, 5}, and the slot n=4, then the last slot in the slot set S earlier than the slot n is the slot 3. As another example, if the slot set S={ 1, 3, 5}, and the slot n=5, then the last slot in the slot set S earlier than the slot n is the slot 3.

Optionally, "the last slot in the slot set S not later than the slot n" refers to the last slot that is in the slot set S and that is temporally not later than the slot n. The slot n may be in the slot set S, or may not be in the slot set S. For example, if the slot set S={1, 3, 5}, and the slot n=4, then the last slot in the slot set S not later than the slot n is the slot 3. As another example, if the slot set S={1, 3, 5}, and the slot n=3, then the last slot in the slot set S not later than the slot n is the slot 3.

Optionally, "send" and "transmit" are interchangeable with each other where applicable.

Optionally, "symbol" may refer to an OFDM symbol where applicable.

Optionally, any two of "within X", "in X", and "on X" are interchangeable with each other where applicable (for example, when one or more operations are performed on one or more resources). X may be one or more carriers (e.g., an SL carrier), or one or more BWPs (e.g., an SL BWP), or one or more resource pools (or sidelink resource pools), or one or more links (e.g., a UL, a DL, or an SL), or one or more channels (e.g., a PSSCH), or one or more sub-channels, or one or more RBGs, or one or more RBs, or one or more "occasions" (e.g., a PDCCH monitoring occasion, a PSSCH transmission occasion, a PSSCH reception occasion, a PSFCH transmission occasion, a PSFCH reception occasion, or the like), or one or more OFDM symbols, or one or more slots, or one or more subframes, or one or more half-frames, or one or more frames, or one or more arbitrary time-domain and/or frequency-domain and/or code-domain and/or spatial-domain resources, or the like.

Optionally, "higher layer" may refer to one or more protocol layers or protocol sub-layers above a physical layer, such as a MAC layer, an RLC layer, a PDCP layer, a PC5 RRC layer, a PC5-S layer, an RRC layer, a V2X layer, an application layer, a V2X application layer, or the like.

Optionally, "pre-configure" may be pre-configuration performed in a higher-layer protocol, such as pre-configured in a specific storage location in the UE (for example, pre-configured according to the specification of the higher layer protocol), or pre-configured in a specific storage location that can be accessed by the UE (for example, pre-configured according to the specification of the higher layer protocol).

Optionally, "configuration" may be configuration performed in a higher layer protocol by means of signaling. For example, configuration is performed for the UE by means of RRC signaling.

Optionally, "configured" may be replaced with "pre-configured". Vice versa.

Optionally, "configured" may be replaced with "configured or pre-configured". Vice versa.

Optionally, "a certain parameter has been configured" may be replaced with "a certain parameter has been provided". Vice versa.

Optionally, "indicating certain information by means of a certain parameter" may be replaced with "providing certain information by means of a certain parameter". Vice versa.

Optionally, "providing certain information by means of a certain parameter" may be replaced with "configuring certain information by means of a certain parameter". Vice versa.

Optionally, "a certain parameter has been configured" may be replaced with "a certain parameter has been signaled". Vice versa.

Optionally, "not configured" may be replaced with "not pre-configured". Vice versa.

Optionally, "not configured" may be replaced with "not configured and/or not pre-configured". Vice versa.

Optionally, "not configured" may be replaced with "not (pre-)configured". Vice versa.

Optionally, a time-domain resource may also be referred to as a time resource.

Optionally, a frequency-domain resource may also be referred to as a frequency resource.

Optionally, a resource block may refer to a virtual resource block (VRB), or may refer to a physical resource block (PRB), or may refer to a common resource block (CRB), or may refer to a resource block defined in another manner.

Optionally, frequency-domain resources may be numbered starting from 0. For example, if the number of sub-channels (or subchannels) configured in a resource pool is $$N_{subChannel}^{SL},$$

a set of sub-channels in the resource pool may be represented by a set of corresponding sub-channel indexes as $$\{0, 1, \ldots, N_{subChannel}^{SL} - 1\}.$$

As another example, a set of subcarriers in a resource block may be represented by a set of corresponding subcarrier indexes as {0, 1, . . . , 11}.

Optionally, time-domain resources may be numbered starting from 0. For example, for 30 kHz SCS, a set of slots in a subframe may be represented by a set of corresponding slot indexes as $\{0, 1\}$.

Optionally, "SCI" may refer to an instance of an SCI format (e.g., SCI format 1-A), or a combination of an instance of a $1^{st}$-stage SCI format (e.g., SCI format 1-A) and an instance of a corresponding $2^{nd}$-stage SCI format (e.g., SCI format 2-A), where applicable. For example, in a received SCI format 1-A, each field corresponds to a determined value. As another example, in an SCI format 1-A for transmission (or, to be transmitted), a value has been determined (or is to be determined) for each field. As another example, for a received SCI format 1-A and a corresponding SCI format 2-A, each field of each SCI format corresponds to a determined value.

Optionally, "SL transmission" may include one or more of the following:

PSSCH transmission.
PSCCH and PSSCH transmission.
PSCCH or PSSCH transmission.
PSFCH transmission.
S-SSB transmission.

Optionally, "PSSCH transmission" may be replaced with "PSCCH and/or PSSCH transmission" or replaced with "PSCCH/PSSCH transmission".

Optionally, "SL resources" may include resources for transmitting one or more of the following:

PSSCH.
PSCCH and PSSCH.
PSCCH or PSSCH.
PSFCH.
S-SSB.

Optionally, if a resource pool and another resource pool correspond to the same frequency domain resource (e.g., the same sub-channel set) and the same time domain resource (e.g., the same slot set), then the two resource pools may be considered the same resource pool.

In communication based on D2D (device to device) technology, an interface between devices (also referred to as user equipment (UE)) may be referred to as a PC5 interface, and a corresponding transmission link on the physical layer may be referred to as a "sidelink" (SL) so as to be distinguished from an uplink (UL) and a downlink (DL). Communication based on an SL may be referred to as sidelink (SL) communication, and a corresponding carrier may be referred to as an SL carrier. An SL based on LTE technology may be referred to as an LTE SL. An SL based on NR technology may be referred to as an NR SL. 5G V2X communication may be based on an LTE SL or an NR SL. Hereinafter, unless otherwise specified, "SL" refers to an NR SL, "SL communication" refers to NR SL communication, and "V2X communication" refers to NR SL-based V2X communication.

A physical layer of an SL can support transmission in one or more modes, such as broadcast transmission, groupcast transmission or unicast transmission, in one or more of in-coverage, out-of-coverage, and partial-coverage scenarios.

For frequency range 1 (FR1), a subcarrier spacing (SCS, denoted as $\Delta f_{SL}$) corresponding to the SL may be 15 kHz (normal CP), or 30 kHz (normal CP), or 60 kHz (normal CP or extended CP). For frequency range 2 (FR2), an SCS corresponding to the SL may be 60 kHz (normal CP or extended CP), or 120 kHz (normal CP). Each SCS corresponds to one SCS configuration (denoted as $\mu_{SL}$). For example, $\Delta f_{SL}=15$ kHz corresponds to $\mu_{SL}=0$, $\Delta f_{SL}=30$ kHz corresponds to $\mu_{SL}=1$, $\Delta f_{SL}=60$ kHz corresponds to $\mu_{SL}=2$, $\Delta f_{SL}=120$ kHz corresponds to $\mu_{SL}=3$, and so on. As another example, for any given $\mu_{SL}$, $\Delta f_{SL}=2^{\mu_{SL}} \cdot 15$ KHz. $\mu_{SL}$ may be an SCS configuration of an SL carrier. For example, all SL transmissions in one SL carrier use the same SCS configuration and/or the same CP. $\mu_{SL}$ may be an SCS configuration of a sidelink bandwidth part (SL BWP, or referred to as S-BWP, or referred to as SBWP, or referred to as SL-BWP, or referred to as BWP-SL, or referred to as BWP for short). For example, all SL transmissions in one SL BWP use the same SCS configuration and/or the same CP. $\mu_{SL}$ may be an SCS configuration of a resource pool. For example, all SL transmissions in one resource pool use the same SCS configuration and/or the same CP.

Signals and channels related to SL operations may include:

an SL PSS (sidelink primary synchronization signal), or referred to as an S-PSS, or referred to as an SPSS, or referred to as an SL-PSS, or referred to as a PSS-SL, or referred to as a PSSS (primary sidelink synchronization signal), or the like;

an SL SSS (sidelink secondary synchronization signal), or referred to as an S-SSS, or referred to as an SSSS (sidelink secondary synchronization signal), or referred to as an SL-SSS, or referred to as an SSS-SL, or referred to as an SSSS (secondary sidelink synchronization signal), or the like;

PSBCH (physical sidelink broadcast channel);

PSCCH (physical sidelink control channel);

PSSCH (physical sidelink shared channel); and

PSFCH (physical sidelink feedback channel).

The SL PSS, the SL SSS, and the PSBCH may be organized together into a block on a time/frequency resource. The block is referred to as, for example, an S-SSB (sidelink synchronization signal/PSBCH block, or SSS/PSBCH block), or is referred to as an SSS/PSBCH block, or is referred to as an SS/PSBCH block, or is referred to as an S-SS/PSBCH block, or is referred to as an SL SSB, or is referred to as an SSSB, or is referred to as an SL-SSB, or is referred to as an SSB-SL. A transmission bandwidth (for example, 11 resource blocks) of the S-SSB may be located in a corresponding SL carrier (for example, located in one SL BWP configured in the SL carrier). The SL PSS and/or the SL SSS may carry SL SSID (sidelink synchronization identity, or sidelink synchronization identifier, or sidelink synchronization signal identity, or sidelink synchronization signal identifier, or sidelink identity, or physical-layer sidelink identity, or referred to as SL-SSID, or referred to as SSID-SL, or referred to as SLSSID, or referred to as SLSSID, or referred to as S-SSID, or the like), and the PSBCH may carry an SL MIB (sidelink master information block, or referred to as SL-MIB, or referred to as S-MIB, or referred to as MIB-SL, or referred to as MasterInformationBlock-Sidelink), which is configured by means of, for example, a parameter masterInformationBlockSidelink.

On the SL, a time-domain resource and/or a frequency-domain resource used to transmit the S-SSB may be configured by means of higher-layer parameter(s). For example, in the frequency domain, a location of the S-SSB in the frequency domain may be configured by means of a parameter absoluteFrequencySSB-SL (or a parameter sl-Absolute-FrequencySSB). As another example, in the time domain, one or more synchronization configuration items may be configured by means of a parameter sl-SyncConfigList. In each synchronization configuration item, $$N_{period}^{S-SSB}$$

S-SSBs within an S-SSB period having a length of 16 frames can be configured by means of a parameter numSSBwithinPeriod-SL (or a parameter sl-NumSSB-WithinPeriod). An index of a slot where an S-SSB having a number (or an index) of $i_{S-SSB}(0 \le i_{S-SSB} \le$ $$N_{period}^{S-SSB} - 1)$$

is located in the period having a length of 16 frames may be $$N_{offset}^{S-SSB} + \left(N_{interval}^{S-SSB} + 1\right) \cdot i_{S-SSB},$$

wherein $$N_{offset}^{S-SSB}$$

may be configured by means of a parameter timeOffsetSSB-SL (or a parameter sl-TimeOffsetSSB), and $$N_{interval}^{S-SSB}$$

may be configured by means of a parameter timeIntervalSSB-SL (or a parameter sl-TimeInterval).

A synchronization source (or referred to as a synchronization reference, or a synchronization reference source) related to SL synchronization may include a GNSS (global navigation satellite system), a gNB, an eNB, and a UE (for example, NR UE, or LTE UE, or NR UE or LTE UE). A UE serving as a synchronization source (for example, a UE transmitting the S-SSB) may be referred to as SyncRefUE.

Examples of the GNSS may include GPS (Global Positioning System), GLONASS (GLObal NAvigation Satellite System), BeiDou (Beidou Navigation Satellite System), Galileo (Galileo Navigation Satellite System), QZSS (Quasi-Zenith Satellite System), etc.

One or more (e.g., one) SL BWPs may be configured in one SL carrier, and one or more resource pools (or referred to as SL resource pools) may be configured in one SL BWP. A resource pool may be considered to be a set of time domain and frequency domain resources, and the time domain and frequency domain resources therein may be used for SL transmission and/or reception (optionally, the SL transmission and/or reception described here does not include S-SSB transmission and/or reception).

For each SL BWP, a starting symbol that can be used for SL may be configured by means of a parameter startSLsymbols (or a parameter sl-StartSymbol) (for example, the symbol is numbered as $$I_{start}^{SL}$$

in the slot), and the number of symbols that can be used for SL may be start configured by means of a parameter lengthSLsymbols (or a parameter sl-LengthSymbols) (for example, the number of symbols is denoted as $$N_{length}^{SL}).$$

The $$N_{length}^{SL}$$

symbols may be consecutive symbols. A value set of $$I_{start}^{SL}$$

may be denoted as $$S_{start}^{SL},$$

for example, $$S_{start}^{SL} = \{0, 1, 2, 3, 4, 5, 6, 7\}.$$

A value set of $$N_{length}^{SL}$$

may be denoted as $$S_{length}^{SL},$$

for example, $$S_{length}^{SL} = \{7, 8, 9, 10, 11, 12, 13, 14\}.$$

The "symbols that can be used for SL transmission" may be referred to as "SL symbols". If a set of SL symbols (in chronological order) is denoted as $$\left\{I_1^{SL}, I_2^{SL}, \ldots, I_{N_{length}^{SL}}^{SL}\right\}, \text{ then}$$

$$I_1^{SL} = I_{start}^{SL}, I_2^{SL} = I_{start}^{SL} + 1, \ldots, I_{N_{length}^{SL}}^{SL} = I_{start}^{SL} + N_{length}^{SL} - 1\}.$$

For example, if $$I_{length}^{SL} = 7 \text{ and } N_{length}^{SL} = 7,$$

then the set of SL symbols is {7, 8, 9, 10, 11, 12, 13}. Optionally, the set of SL symbols may be applicable to all resource pools in the corresponding SL BWP. Optionally, the time-domain and frequency-domain resources corresponding to the S-SSB may be configured independently of the resource pool, and correspondingly, the set of SL symbols is not applicable to S-SSB transmission and/or reception.

Only a slot meeting a certain condition can be configured to be used for SL (e.g., used for SL transmission and/or reception). For example, such a slot is referred to as an "SL slot", or a "candidate SL slot", or an "SL candidate slot", or a "slot that can be configured to be used for a certain resource pool" or a "slot that may belong to a certain resource pool". A set of all slots within one SFN period (or one DFN period) is denoted as $T_{all}$={0, 1, . . . , 10240×2$^{\mu_{SL}}$−1}, and a set of all "SL slots" within one SFN period (or one DFN period) is denoted as $$T_{all}^{SL} = \left\{ t_0^{SL}, t_1^{SL}, \ldots, t_{T_{max}-1}^{SL} \right\},$$

where $T_{max}$ is the number of elements in the set $$T_{all}^{SL}.$$

Optionally, for $$0 \leq i < T_{max}, t_i^{SL}$$

is numbered within the SFN period (or the DFN period) (i.e., $$0 \leq t_i^{SL} < 10240 \times 2^{\mu_{SL}}).$$

Optionally, $$t_0^{SL} < t_1^{SL} < \ldots < t_{T_{max}-1}^{SL}.$$

The set $$T_{all}^{SL}$$

may be acquired by excluding the following slots from the set $T_{all}$:

Slots configured with S-SSB (for example, the number of such slots is denoted as $N_{S\_SSB}$).

Slots satisfying a first UL configuration condition (for example, the number of such slots is denoted as $N_{nonSL}$). wherein Optionally, for a slot t, the first UL configuration condition may be that in the slot t, at least one of the symbols $$l_{start}^{SL}, l_{start}^{SL} + 1, \ldots, l_{start}^{SL} + N_{length}^{SL} - 1$$

is not configured to be a UL symbol. The "configured to be a UL symbol" may be carried out in a semi-persistent manner, for example, configured by means of a parameter tdd-UL-DL-ConfigurationCommon, or configured by means of a parameter sl-TDD-Configuration, or configured by means of a parameter sl-TDD-Config.

Reserved slots. For example, optionally, the reserved slots may be determined in the following manner:

After the $N_{S\_SSB}$ slots configured with S-SSB and the $N_{nonSL}$ slots satisfying the first UL configuration condition are excluded from the set $T_{all}$, the set of the remaining slots is denoted as $$T_{remaining} = \left\{ l_0, l_1, \ldots, l_{10240 \times 2^\mu - N_{S_{SSB}} - N_{nonSL} - 1} \right\}.$$

Optionally, the slots in the set $T_{remaining}$ are arranged in ascending order of slot indexes (or numbers).

If a slot $$L_r \left( 0 \leq r < 10240 \times 2^\mu - N_{S_{SSB}} - N_{nonSL} \right)$$

satisfies $$r = \left\lfloor \frac{m \cdot \left( 10240 \times 2^\mu - N_{S_{SSB}} - N_{nonSL} \right)}{N_{reserved}} \right\rfloor,$$

the slot $l_r$ belongs to the reserved slots, where m=0, 1, . . . , and $N_{reserved}$−1, $$N_{reserved} = \left( 10240 \times 2^\mu - N_{S_{SSB}} - N_{nonSL} \right) \mathrm{mod} L_{reserved,thresh}^{SL},$$

and $L_{reserved,thresh}^{SL}$ may be a predefined or configured or pre-configured value, or may be one of a plurality of predefined or configured or pre-configured values (for example, a value is determined from a plurality of predefined or configured or pre-configured values according to a resource pool to be configured).

For each resource pool (for example, denoted as u),

In the frequency domain, each sub-channel may consist of one or more resource blocks, and the specific number of the resource blocks (for example, referred to as the size of the sub-channel, such as denoted as $$n_{subCH,size}^{SL,u} )$$

may be configured by means of a parameter (for example, sl-SubchannelSize). The $$n_{subCH,size}^{SL,\mu}$$

resource blocks may be consecutive in the frequency domain.

In the frequency domain, the index (or the number) of a starting resource block of a starting sub-channel of the resource pool in the corresponding SL BWP may be configured by means of a parameter (for example, sl-StartRB-Subchannel), and is denoted as, for example, $$n_{RB,start}^{SL,u}.$$

In the frequency domain, the number (for example, denoted as $$N_{subCH}^{SL,u})$$

of sub-channels occupied by the resource pool may be configured by means of a parameter (for example, sl-NumSubchannel). The $$N_{sub,CH}^{SL,u}$$

sub-channels may be consecutive in the frequency domain.

In the frequency domain, the number (denoted as $$N_{PRB}^{SL,u})$$

of PRBs occupied by the resource pool may be configured by means of a parameter (for example, sl-RB-Number). Optionally, the UE may assume that the last $$N_{PRB}^{SL,u} \bmod n_{sub,CH,size}^{SL,u}$$

PRBs in the $$N_{PRB}^{SL,u}$$

PRBs are not to be used.

In the frequency domain, sub-channels in a resource pool may be respectively numbered as $$0, 1, \ldots, N_{subch}^{SL} - 1$$

in a certain order (for example, in ascending order from low frequency to high frequency). A sub-channel numbered as i may be referred to as "sub-channel i"

$$(0 \leq i \leq N_{subch}^{SL} - 1),$$

In the time domain, a slot bitmap (for example, corresponding bits are denoted as $$b_0, b_1, \ldots, b_{L_{bitmap}^{SL,u} - 1}, \text{ where } L_{bitmap}^{SL,u}$$

is the number of bits in the slot bitmap) may be configured by means of a parameter (for example, sl-TimeResource) to determine a subset (for example, denoted as $$T_u^{SL})$$

of the set $$T_{all}^{SL}.$$

The set $$T_u^{SL}$$

is the slot set of the resource pool. Specifically, Optionally, the set $$T_u^{SL}$$

may be initialized to be an empty set.

Optionally, for each k (for example, in ascending order of k) satisfying $$0 \leq k < 10240 \times 2^\mu - N_{S_{SSB}} - N_{nonSL} - N_{reserved}, \ k' - k \bmod L_{bitmap}^{SL,u}.$$

If $b_k = 1$, then the slot $$t_k^{SL}$$

in the set $$T_{all}^{SL}$$

belongs to the set $$T_u^{SL}$$

(or, the slot $$t_k^{SL}$$

in the set $$T_{all}^{SL}$$

is added to the set $$T_u^{SL}).$$

Optionally, elements in the set $$T_u^{SL}$$

may be re-labeled as several slots having consecutive subscripts (for example, labeled according to the order of being added to the set $$T_u^{SL},$$

such as sequentially labeled as $$t_0^{SL,u}, t_1^{SL,u}, \ldots, t_{T_{max}'^u-1}^{SL,u}), \text{ i.e., } T_u^{SL} = \left\{ t_0^{SL,u}, t_1^{SL,u}, \ldots, t_{T_{max}'^u-1}^{SL,u} \right\},$$

where $$T_{max}'^u$$

is the number of elements in the set $$T_u^{SL}.$$

Optionally, the $$L_{reserved,thresh}^{SL}$$

may be related to a resource pool to be configured. For example, for the resource pool u, $$L_{reserved,thresh}^{SL} = L_{bitmap}^{SL,u}.$$

A resource pool may be configured to be a "transmission resource pool", and resources therein may be used for data transmission and/or HARQ-ACK information reception in SL communication, etc.

A resource pool may also be configured to be a "reception resource pool", and resources therein may be used for data reception and/or HARQ-ACK information transmission in SL communication, etc.

Methods for allocating resources (such as time-domain resources, or frequency-domain resources, or code-domain resources, or spatial-domain resources) related to SL operations may include:

Mode 1 (or resource allocation mode 1, or sidelink resource allocation mode 1): a base station schedules a resource for SL transmission.

Mode 2 (or resource allocation mode 2, or sidelink resource allocation mode 2): UE determines a resource for SL transmission (i.e., the base station does not participate in scheduling of any resource for SL transmission). For example, UE performing an SL transmission operation autonomously determines a resource for SL transmission.

For an SL transmission, the transmitter may be referred to as TX UE, and the receiver may be referred to as RX UE.

One UE may correspond to (or be associated with) one or more "source layer-2 identifiers" (source layer-2 ID or source layer-2 UE ID) and/or one or more "destination layer-2 identifiers" (destination layer-2 ID or destination layer-2 UE ID). wherein Optionally, a source layer-2 identifier may be an integer represented by several (e.g., 24) bits.

A destination layer-2 identifier may be an integer represented by several (e.g., 24) bits.

Optionally, several (e.g., eight) least significant bits of a "source layer-2 identifier" may be used as a "source layer-1 identifier" (source layer-1 ID or source layer-1 UE ID). Optionally, the "source layer-1 identifier" may be indicated in layer-1 signaling, for example, indicated in SCI.

Optionally, several (e.g., eight) least significant bits of a "destination layer-2 identifier" may be used as a "destination layer-1 identifier" (destination layer-1 ID or destination layer-1 UE ID). Optionally, the "destination layer-1 identifier" may be indicated in layer-1 signaling, for example, indicated in SCI.

Optionally, in an SL transmission in which the UE acts as the transmitter, the "source layer-2 identifier" may be used to indicate a source layer-2 identifier of the UE.

Optionally, in an SL unicast transmission in which the UE acts as the transmitter, the "destination layer-2 identifier" may be used to indicate a source layer-2 identifier of an expected receiver of the SL transmission.

Optionally, in an SL groupcast transmission in which the UE acts as the transmitter, the "destination layer-2 identifier" may be used to indicate a destination layer-2 identifier corresponding to (or associated with) the groupcast transmission.

Optionally, in an SL broadcast transmission in which the UE acts as the transmitter, the "destination layer-2 identifier" may be used to indicate a destination layer-2 identifier corresponding to (or associated with) the broadcast transmission.

Optionally, in an SL unicast transmission that is detected by the UE and comes from other UE, if the "destination layer-2 identifier" indicates a source layer-2 identifier of the UE, and the "source layer-2 identifier" indicates a destination layer-2 identifier of the UE, then the UE can be considered an expected receiver of the SL transmission.

Optionally, in an SL groupcast transmission that is detected by the UE and comes from other UE, if the "destination layer-2 identifier" indicates a destination layer-2 identifier of the UE (for example, a destination layer-2 identifier for groupcast), then the UE can be considered an expected receiver of the SL transmission.

Optionally, in an SL broadcast transmission that is detected by the UE and comes from other UE, if the "destination layer-2 identifier" indicates a destination layer-2 identifier of the UE (for example, a destination layer-2 identifier for broadcast), then the UE can be considered an expected receiver of the SL transmission.

The UE may schedule data transmission via sidelink control information (SCI). SL operations may support "two-stage SCI". 1$^{st}$-stage SCI may include information such as resource reservation and/or resource assignment, so that all UEs monitoring the SL may perform sensing with respect to a resource reservation and/or resource assignment status. $2^{nd}$-stage SCI may include other information, such as information related to HARQ feedback and the like. Hereinafter, unless otherwise specified, when mentioned individually, "SCI" may refer to the $1^{st}$-stage SCI, or the $2^{nd}$-stage SCI, or the $1^{st}$-stage SCI and the $2^{nd}$-stage SCI, where applicable.

A format of the $1^{st}$-stage SCI may be SCI format 1-A (or written as "SCI format 1_A"). The following are some examples of the information that can be included in SCI format 1-A:

priority;

frequency resource assignment;

time resource assignment;

resource reservation period;

DMRS pattern; and $2^{nd}$-stage SCI format.

The maximum value (for example, denoted as $$N_{res}^{max})$$

of the number of assigned and/or reserved and/or indicated resources (e.g., PSCCH/PSSCH resources) in each $1^{st}$-stage SCI format may be a value configured or pre-configured by a higher layer protocol (for example, configured or pre-configured by means of a parameter sl-MaxNumPerReserve). The "assigned and/or reserved and/or indicated resources" may include a resource corresponding to a PSCCH corresponding to the $1^{st}$-stage SCI format and/or a corresponding PSSCH. For example, if the "frequency resource assignment" and/or the "time resource assignment" corresponds to three resources, then the first resource may be a resource corresponding to a PSCCH corresponding to the $1^{st}$-stage SCI format and/or a corresponding PSSCH (for example, referred to as "a resource corresponding to the current SL transmission"), and the other two resources may be two resources that are reserved and/or assigned for the $1^{st}$-stage SCI format and that can be used for other SL transmission (for example, a resource used in the same transport block when performing retransmission in a future slot). The size of the "frequency resource assignment" field may be related to $$N_{res}^{max}.$$

For example, when $$N_{res}^{max} = 2,$$

the size of the "frequency resource assignment" field is $$\left\lceil \log_2\left(\frac{N_{subch}^{SL}\left(N_{subch}^{SL} + 1\right)}{2}\right)\right\rceil$$

bits. As another example, when $$N_{res}^{max} = 3,$$

the size of the "frequency resource assignment" field is $$\left\lceil \log_2\left(\frac{N_{subChannel}^{SL}\left(N_{subChannel}^{SL} + 1\right)\left(2N_{subChannel}^{SL} + 1\right)}{6}\right)\right\rceil$$

bits. The size of the "time resource assignment" field may be related to $$N_{res}^{max}.$$

For example, when $$N_{res}^{max} = 2,$$

the size of the "time resource assignment" field is five bits. As another example, when $$N_{res}^{max} = 3,$$

the size of the "time resource assignment" field is nine bits. res

A resource assigned and/or reserved and/or indicated by a $1^{st}$-stage SCI format may be aperiodic. In addition, under a certain condition (for example, if a parameter sl-MultiReserveResource has been configured or pre-configured), then the $1^{st}$-stage SCI format may indicate, by means of a "resource reservation period" field, one of several "resource reservation periods" (or, "resource reservation intervals") configured or preconfigured by a higher layer protocol parameter (e.g., sl-ResourceReservePeriodList) (for example, the value of the indicated resource reservation period is denoted as $$P_{rsvp}^{SL}).$$

In this case, the $1^{st}$-stage SCI may assign and/or reserve and/or indicate a resource that recurs periodically. For example, if resources indicated by the "frequency resource assignment" and/or the "time resource assignment" in the $1^{st}$-stage SCI include a resource in the slot $$t_m^{\prime SL,u},$$

then the resource set assigned and/or reserved and/or indicated by the $1^{st}$-stage SCI format not only includes the resource in the slot $$t_m^{\prime SL,u},$$

but also includes resources that are in slots $$t_{m+1 \times P_{rsvp}^{SL}}^{\prime SL,u}, t_{m+2 \times P_{rsvp}^{SL}}^{\prime SL,u}, \cdots$$

and that correspond to the same sub-channel set. Two resources at an interval of $$P_{rsvp}^{SL}$$

may be used to transmit two different TBs.

A format of the $2^{nd}$-stage SCI may be SCI format 2-A (or written as "SCI format 2_A") or SCI format 2-B (or written as "SCI format 2_B") or another SCI format. The following are some examples of the information that can be included in SCI format 2-A and/or SCI format 2-B:

source layer-1 identifier;

destination layer-1 identifier;

HARQ process ID, or HARQ process number;

new data indicator (NDI); and redundancy version (RV).

The $1^{st}$-stage SCI may be carried on a PSCCH. The $2^{nd}$-stage SCI may be multiplexed, together with data to be transmitted, on a PSSCH associated with (or scheduled by) the PSCCH. The PSCCH and the PSSCH associated therewith may be multiplexed, in a certain manner, on the time-domain resource and/or the frequency-domain resource allocated for SL transmission (for example, the sub-channel where a starting resource block of the PSCCH is located may be the starting sub-channel of the PSSCH associated therewith, and as another example, the starting resource block of the PSCCH may be a starting resource block of the starting sub-channel of the PSSCH associated therewith). In addition, it may be considered that the $1^{st}$-stage SCI and/or the corresponding $2^{nd}$-stage SCI schedules the corresponding PSSCH (or schedules transmission of the PSSCH, or schedules transmission of a TB carried on the PSSCH).

If HARQ feedback is enabled, the RX UE may feed back information (e.g., referred to as "HARQ-ACK information") related to PSCCH and/or PSSCH reception by means of a PSFCH. For example, when the RX UE receives a PSSCH in a resource pool, and the value of the "HARQ feedback enabled/disabled indicator" field in the corresponding SCI is 1, the RX UE provides HARQ-ACK information via PSFCH transmission in the resource pool. Such HARQ-ACK information may be referred to as "HARQ-ACK information reported on the SL and related to the SL transmission". In some configurations, the HARQ-ACK information reported on the SL and related to the SL transmission may indicate a positive acknowledgement (ACK or acknowledgement) indicating, for example, that data carried by a corresponding PSCCH and/or PSSCH can be correctly decoded, or may indicate a negative acknowledgement (NACK or NAK) indicating, for example, that data carried by a corresponding PSCCH and/or PSSCH cannot be correctly decoded. In some other configurations, the HARQ-ACK information reported on the SL and related to the SL transmission may indicate only NACK (for example, no HARQ feedback is transmitted when data carried by a corresponding PSCCH and/or PSSCH can be correctly decoded, whereas NACK is transmitted when data carried by a corresponding PSCCH and/or PSSCH cannot be correctly decoded). "ACK" and "NACK" may be referred to as HARQ-ACK values.

A RX UE, when performing SL reception, may receive only PSCCH and/or PSSCH transmission meeting an SL reception condition. The SL reception condition may include one or more of the following:

The combination of a source layer-1 identifier and/or a destination layer-1 identifier and/or a cast type (e.g., unicast, groupcast, or broadcast) determined according to SCI is consistent with one combination (e.g., one of one or more combinations) of a source layer-1 identifier and/or a destination layer-1 identifier and/or a cast type allowed for reception in the RX UE.

A source layer-2 identifier and/or a destination layer-2 identifier and/or a cast type determined according to SCI and/or a corresponding MAC PDU subheader is consistent with one combination (e.g., one of one or more combinations) of a source layer-2 identifier and/or a destination layer-2 identifier and/or a cast type allowed for reception in the RX UE.

In the time domain, PSFCH resources may recur periodically in a resource pool. For example, a corresponding period (referred to as, for example, "PSFCH period" or "PSFCH resource period", e.g., denoted as $$N_{PSSCH}^{PSFCH},$$

and in units of, for example, the number of slots) may be configured by means of a parameter periodPSFCHresource (or a parameter sl-PSFCH-Period), and configured to be, for example, $$N_{PSSCH}^{PSFCH} = 0, \text{ or } N_{PSSCH}^{PSFCH} = 1, \text{ or } N_{PSSCH}^{PSFCH} = 2, \text{ or } N_{PSSCH}^{PSFCH} = 4). \ N_{PSSCH}^{PSFCH} = 0$$

may be used to indicate that no PSFCH resource is configured in a corresponding resource pool. For example, if a resource pool is not configured with any PSFCH-related parameter (such as a parameter sl-PSFCH-Config, or one or more parameters in the parameter sl-PSFCH-Config), or if the PSFCH period configured in the parameter sl-PSFCH-Config is 0, then it is indicated that the resource pool is not configured with any PSFCH resource. As another example, if a resource pool is configured with the parameter sl-PSFCH-Config, and if the value of the PSFCH period configured in the parameter sl-PSFCH-Config is not 0, then it is indicated that the resource pool is configured with a PSFCH resource.

A slot configured with a PSFCH resource may be referred to as "PSFCH slot". Within one PSFCH slot, symbols related to PSFCH transmission may be the last one or more SL symbols of the slot. For example, for PSFCH format 0, the symbol $$l_{start}^{SL} + N_{length}^{SL} - 1$$

may be used as a gap symbol or a guard symbol, the symbol $$l_{start}^{SL} + N_{length}^{SL} - 2$$

may be used for PSFCH transmission, content transmitted on the symbol $$l_{start}^{SL} + N_{length}^{SL} - 2$$

may be copied to the symbol $$I^{SL}_{start} + N^{SL}_{length} - 3$$

(or, the symbol $$I^{SL}_{start} + N^{SL}_{length} - 2$$

and the symbol $$I^{SL}_{start} + N^{SL}_{length} - 3$$

are both used for PSFCH transmission), and for UE that receives a PSFCH, the symbol $$I^{SL}_{start} + N^{SL}_{length} - 3$$

may be used for automatic gain control (AGC). Other SL symbols for a PSFCH slot may be used to transmit other SL signals/channels, such as a PSCCH, a PSSCH, etc.

In SL resource allocation mode 2, allocated SL resources may be determined by using one or more methods. For example, a set of "available resources" (or "idle resources") may be determined by using different methods, and then one or more SL resources for SL transmission are selected (e.g., randomly selected) from the set of the "available resources" (or "idle resources"). In embodiments and implementations of the present invention, a method for determining a set of "available resources" may be referred to as a "resource selection mechanism" or a "resource selection method" or a "resource selection scheme" or a "resource determination mechanism" or a "resource determination method" or a "resource determination scheme" or a "resource allocation mechanism" or a "resource allocation method" or a "resource allocation scheme" or the above designations plus the prefix "SL" (such as "SL resource selection mechanism"), or the like. Alternatively, a set of all operations for determining allocated SL resources is referred to as "resource selection mechanism". Alternatively, a set of some operations for determining allocated SL resources is referred to as "resource selection mechanism".

If a UE uses a certain resource selection mechanism in SL resource allocation mode 2, the UE can be referred to as implementing SL resource allocation mode 2 on the basis of the resource selection mechanism.

Operations corresponding to SL resource allocation mode 2 may include: in a slot n, requesting, by a higher layer protocol entity (e.g., a MAC layer protocol entity), a physical layer protocol entity to determine, according to an input parameter set (e.g., denoted as $P_A$), a resource subset (e.g., denoted as $S_A$) from which resource(s) may be selected, and reporting, by the physical layer protocol entity, the resource subset $S_A$ to the higher layer protocol entity (e.g., the MAC layer protocol entity).

The input parameter set $P_A$ may include one or more of the following:

A resource pool (e.g., denoted as $u_{sel}$) for performing resource selection. For example, the resource subset $S_A$ may be a subset of a set of candidate resources in the resource pool $u_{sel}$.

A priority (e.g., a layer-1 priority, or a physical layer priority, e.g., denoted as $prio_{TX}$).

A remaining packet delay budget.

A resource size. For example, the "resource size" may include the number of sub-channels occupied by each resource (e.g., the number of consecutive sub-channels), e.g., denoted as $L_{subCH}$. As another example, the "resource size" may include the number of slots occupied by each resource (e.g., the number of consecutive slots), e.g., denoted as $L_{slot}$. Optionally, $L_{subCH}$ and/or $L_{slot}$ may be a predefined or configured or pre-configured value, e.g., $L_{slot}=1$ (in this case, the resource may be referred to as a single-slot resource).

A resource reservation interval, e.g., denoted as $P_{rsvp\_TX}$.

A resource set for a re-evaluation operation, e.g., denoted as $(r_0, r_1, r_2, \ldots)$.

A resource set for a pre-emption operation, e.g., denoted as $(r'_0, r'_1, r'_2, \ldots)$.

To determine the resource subset $S_A$, the set $S_A$ may be initialized to be a set (e.g., denoted as $S_{all}$) consisting of all candidate resources, and then unavailable resources (e.g., resources reserved by other UEs) are removed from the set $S_A$, and the resulting set Sa is the requested resource subset.

The "set $S_{all}$ consisting of all candidate resources" may be a set of all resources corresponding to $L_{subCH}$ sub-channels and $L_{slot}$ slots in the resource pool $u_{sel}$ and in a resource selection window (e.g., a time window corresponding to a time interval $[n+T_1, n+T_2]$), or a subset of the set (e.g., including only resources in a slot that can be used to transmit a PSCCH and/or a PSSCH, wherein, for example, in an SL symbol set configured in a certain slot in the resource pool $u_{sel}$, if the number of SL symbols that can be used to transmit a PSCCH and/or a PSSCH does not correspond to any PSSCH DMRS mode, then the slot cannot be used to transmit a PSCCH and/or a PSSCH, so that resources in the slot may not belong to the set $S_{all}$). $T_1$ and $T_2$ may be two values determined by the UE and meeting a certain condition. For example, $T_1$ may be related to processing capabilities of the UE, and $T_2$ may be related to the remaining packet delay budget.

For a UE that uses SL resource allocation mode 2, the "unavailable resources" removed from the set $S_A$ may include one or more of the following:

A resource that cannot be used to perform SL transmission thereon due to the transmission capability limitations of the UE. For example, due to the limitations on the number of simultaneous transmissions supported by the UE, the UE cannot perform SL transmission on an SL carrier corresponding to the set $S_A$ when the UE is performing transmission on another carrier. As another example, due to the limitations on carrier combinations supported by the UE, the UE cannot perform SL transmission on an SL carrier corresponding to the set S when the UE is performing transmission on another carrier. As another example, because a time requirement required for tuning to a certain resource in the set $S_A$ exceeds the capability of the UE, the UE cannot perform SL transmission on the resource.

An unavailable resource identified by the UE by means of a sensing operation. For example, resource reservation information (e.g., resource reservation information in SCI) transmitted on an SL (e.g., transmitted by another UE) is monitored, detected, or received, so as to determine a set of reserved resources, and/or a set of resources that cannot be determined as reserved or not reserved, and/or a set of resources that may result in a collision, and/or a set of allocated resources, and/or a set of resources that cannot be used for allocation, etc. An unavailable resource indicated by another UE or a base station. For example, another UE monitors, detects, or receives resource reservation information (e.g., resource reservation information in SCI) transmitted on an SL, so as to determine a set of reserved resources, and/or a set of resources that cannot be determined as reserved or not reserved, and/or a set of resources that may result in a collision, and/or a set of allocated resources, and/or a set of resources that cannot be used for allocation, and/or a set of resources that are not allocated with priority, etc. The other UE may indicate information related to these resources to the UE via signaling carried in the SL transmission.

The operations corresponding to SL resource allocation mode 2 may include: selecting, from the resource subset $S_A$, a resource for a PSSCH/PSCCH transmission (e.g., a PSSCH transmission, or a PSCCH transmission, or a PSSCH transmission and a PSCCH transmission multiplexed in the same resource).

The operations corresponding to SL resource allocation mode 2 may include: selecting, from the resource subset $S_A$, a resource for a plurality of PSSCH/PSCCH transmissions.

The operations corresponding to SL resource allocation mode 2 may include: selecting, from the resource subset $S_A$, a transmission resource for a transport block, for example, selecting, from the resource subset $S_A$, a resource for an initial transmission of the transport block and each retransmission thereof.

The operations corresponding to SL resource allocation mode 2 may include: selecting, from the resource subset $S_A$, a transmission resource for a plurality of transport blocks, for example, selecting, from the resource subset $S_A$, a resource for an initial transmission of each of the plurality of transport blocks and each retransmission thereof.

In SL resource allocation mode 2, a "random selection" method may be used to select a resource from the resource subset $S_A$. For example, a resource is selected from the resource subset S according to an equal probability method.

If a resource selection mechanism identifies an unavailable resource by means of a sensing operation, it can be considered that the resource selection mechanism is a "sensing-based resource selection mechanism". The sensing operation may be "full sensing" (or simply "sensing"). For example, the UE must monitor all slots that are in a sensing window (e.g., a time window corresponding to a time interval $$\left[ n - T_0, n - T_{proc,0}^{SL} \right]$$

and/or a time window defined in other manners) and belong to (or may belong to) the resource pool $u_{sel}$ except the slots that cannot be monitored due to some exceptional circumstances (e.g., the slots that cannot be monitored during SL transmission due to half-duplex limitations) and/or some special slots (e.g., slots that cannot be used to transmit a PSCCH and/or a PSSCH), where $T_0$ may be configured by means of a higher-layer parameter (e.g., the parameter sl-SensingWindow), and $$T_{proc,0}^{SL}$$

may be related to the processing capability of the UE. The corresponding resource selection mechanism may be referred to as "full-sensing-based resource selection mechanism", or "full-sensing-based resource selection", or simply "full sensing", or simply, if no confusion will be caused, "sensing-based resource selection mechanism", or "sensing-based resource selection", or simply "sensing".

The sensing operation may also be "partial sensing". For example, the UE only needs to monitor some slots (e.g., some slots that occur periodically) that are in the sensing window and belong to (or may belong to) the resource pool $u_{sel}$. The corresponding resource selection mechanism may be referred to as "partial-sensing-based resource selection mechanism", or "partial-sensing-based resource selection", or simply "partial sensing".

If a resource selection mechanism does not involve (or, does not perform) any sensing operation, it can be considered that the resource selection mechanism is a "resource selection mechanism not based on sensing". For example, the set $S_A$ may be equal to the "set $S_{all}$ consisting of all candidate resources", or may be equal to a set acquired by removing some special sources from the "set $S_{all}$ consisting of all candidate resources". The special resources may include one or more of the following:

A resource in a slot that cannot be used to perform PSCCH/PSSCH transmission.

A resource that cannot be used to perform SL transmission thereon due to the transmission capability limitations of the UE.

An unavailable resource indicated by another UE or a base station.

The corresponding resource selection mechanism may be referred to as "random resource selection", or simply "random selection", or "random resource selection not based on sensing".

In addition, there may also be "sensing-based random resource selection". For example, in the sensing-based resource selection mechanism, if a sensing result cannot be applied due to a certain reason, or only part of a sensing result is applied, then the resource selection can be considered "sensing-based random resource selection".

Different UEs may support different sets of resource selection mechanisms. For example, all UEs support "random resource selection". As another example, some UEs only support "full sensing" and "random resource selection". As another example, some UEs only support "partial sensing" and "random resource selection". As another example, some UEs support "full sensing", "partial sensing", and "random resource selection". The set of resource selection mechanisms supported by the UE may be referred to as $M_{cap}$.

In various SL resource selection mechanisms, it can be considered that "full sensing" consumes a relatively large amount of power (or energy), and is more suitable for UEs not sensitive to power consumption (e.g., a UE mounted on an automobile in V2V communication). "Partial sensing", "random resource selection", etc. consume a relatively small amount of power, and are more suitable for UEs sensitive to power consumption and/or communication scenarios sensitive to power consumption (e.g., a handheld device corresponding to a "pedestrian" in V2P communication). In another aspect, "random resource selection" may be used as an exception addressing mechanism, or a fallback mechanism for another resource selection mechanism (e.g., "full sensing") (e.g., in V2V communication, when no sensing result is temporarily available, fallback from "full sensing" to "random resource selection" may be performed). Hence, "random resource selection" may also be applied to UEs not sensitive to power consumption. Certainly, the disadvantage of SL resource selection mechanisms such as "partial sensing", "random resource selection", etc., is that the probability of collisions between resources selected by different UEs is increased.

The SL resource selection mechanisms such as "partial sensing", "random resource selection", etc., may be applied to SL communication as part of "SL power saving" characteristics. For example, "partial sensing" can only be used when "SL power saving" is enabled (or activated, or configured), and the like.

When "SL power saving" is enabled, UE may be in one of a plurality of states (e.g., referred to as SL states, or SL modes, or SL communication methods, or the like) related to "SL power saving", such as:

First SL state. For example, the first SL state may be an "SL non-power saving state". For example, a UE in this SL state is not sensitive to power (or energy) consumption, and correspondingly, the used resource selection mechanism does not require particularly taking into consideration power (or energy) consumption. The first SL state may also be referred to as "first SL mode", or "first SL communication method", etc. The SL non-power saving state may also be referred to as "SL non-power saving mode", or "SL non-power saving communication method", etc. An example of the SL non-power saving communication method may be some specific V2X communication methods (e.g., V2V).

Second SL state. The second SL state may be an "SL power saving state". For example, UE in this SL state is relatively or extremely sensitive to power (or energy) consumption, and correspondingly, the used resource selection mechanism requires taking into consideration power (or energy) consumption. For example, use of a resource selection mechanism that has high power consumption is avoided or reduced. The second SL state may also be referred to as "second SL mode", or "second SL communication method", etc. The SL power saving state may also be referred to as "SL power saving mode", or "SL power saving communication method", etc. An example of the SL power saving communication method may be some specific V2X communication methods (e.g., V2P). Another example of the SL power saving communication method may be an SL communication method used for public security.

"SL power saving" may be enabled (or "activated", or "configured") or disabled (or deactivated) by means of a higher layer protocol parameter (e.g., referred to as sl-powerSavingConfig). For example, if the parameter sl-powerSavingConfig is not present (or not configured), it is indicated that "SL power saving" is not enabled or is disabled. As another example, if the parameter sl-power-SavingConfig is present (or configured), it is indicated that "SL power saving" is enabled. As another example, if the value of the parameter sl-powerSavingConfig (or a certain parameter in an information element corresponding to the parameter sl-powerSavingConfig) is a predefined value (e.g., "disabled", "false", or the like), it is indicated that "SL power saving" is not enabled or is disabled. As another example, if the value of the parameter sl-powerSavingConfig (or a certain parameter in an information element corresponding to the parameter sl-powerSavingConfig) is a predefined value (e.g., "enabled", "true", or the like), it is indicated that "SL power saving" is enabled.

If "SL power saving" is not enabled, the UE may be considered to be always in the first SL state.

The set $M_{cap}$ of resource selection mechanisms supported by the UE may be related to the SL state that the UE is in. For example, if the UE is in the first SL state, the set $M_{cap}$ is equal to a set $M_{cap,1}$. As another example, if the UE is in the second SL state, the set $M_{cap}$ is equal to a set $M_{cap,2}$. Optionally, the set $M_{cap,1}$ and the set $M_{cap,2}$ may be the same or may be different. For example, the set $M_{cap,1}$ is { full sensing}. As another example, the set $M_{cap,1}$ is {full sensing, random resource selection}. As another example, the set $M_{cap,1}$ is {full sensing, partial sensing, random resource selection}. As another example, the set $M_{cap,2}$ may be {random resource selection}. As another example, the set $M_{cap,2}$ may be {partial sensing, random resource selection}.

An inter-UE coordination function can be supported in SL communication, and used for, for example, coordination in resource (e.g., SL resources) allocation and/or reservation and/or indication between two or more UEs. Specifically, for example, a UE (e.g., referred to as UE A) may transmit an "inter-UE coordination message" to one or more other UEs (for example, collectively referred to as UE B), and one (or more) resource sets may be indicated therein.

Each resource indicated in an inter-UE coordination message transmitted from UE A to UE B may correspond to a "resource type" (or "resource state", or "resource feature", or "resource use"), such as one of the following:

"Reserved resource" (or "resource being reserved" or "resource to be reserved" or "resource for reservation" or "allocated resource", or "resource being allocated", or "resource to be allocated", or "resource for allocation"). For example, the resource has been reserved (or allocated) by UE A. Specifically, the resource may be reserved by UE A for a particular UE, such as UE A itself, or such as UE B.

"Released resource" (or "resource being released" or "resource to be released" or "resource for release"). For example, UE A expects to release a resource reserved by UE A in previously transmitted SCI. A cause of releasing the resource may be that the resource is selected for one (e.g., the last one) of several retransmissions of a TB, but UE A has already received an acknowledgement of the TB before the slot corresponding to the resource arrives).

"Colliding resource". For example, UE A detects a resource reservation collision in a slot and/or one or more sub-channels where the resource is located. Optionally, the "collision" may be a collision in a slot that has elapsed, and corresponding collision detection may be referred to as "post-collision detection". Optionally, the "collision" may be a collision in a future slot (or referred to as a "potential collision"), and corresponding collision detection may be referred to as "pre-collision detection".

"Preferred resource". For example, UE A expects that UE B selects (or, selects with priority) said resource during resource selection (for example, when UE B performs SL transmission to UE A).

"Non-preferred resource". For example, UE A expects that UE B excludes (or, excludes with priority) said resource during resource selection (for example, when UE B performs SL transmission to UE A).

An inter-UE coordination message may be triggered autonomously by a UE transmitting the inter-UE coordination message. For example, if UE A detects that resources respectively indicated (or reserved, or allocated) by UE B1 and UE B2 collide with each other, UE A may transmit an inter-UE coordination message to indicate the colliding resources. The inter-UE coordination message may be transmitted in a broadcast or groupcast manner, or is respectively transmitted to UE B1 and UE B2 in a unicast manner.

An inter-UE coordination message may be triggered by an "inter-UE coordination request message" transmitted by one or more other UEs. In this case, the inter-UE coordination message may also be referred to as "inter-UE coordination response message". For example, UE B transmits an "inter-UE coordination request message" to UE A, and UE A transmits an "inter-UE coordination response message" to UE B as a response.

An inter-UE coordination message may be a physical layer message. For example, the inter-UE coordination message may be included in SCI (e.g., $1^{st}$-stage SCI, or $2^{nd}$-stage SCI). As another example, the inter-UE coordination message may be multiplexed in a PSSCH (for example, the inter-UE coordination message and $2^{nd}$-stage SCI and/or an SL-SCH may be multiplexed in the same PSSCH transmission). As another example, the inter-UE coordination message may be multiplexed in a PSCCH (for example, the inter-UE coordination message and $1^{st}$-stage SCI may be multiplexed in the same PSCCH transmission).

An inter-UE coordination message may be a higher layer (e.g., the MAC layer, or the RRC layer) message. For example, the inter-UE coordination message may be carried in a MAC CE. As another example, the inter-UE coordination message may be an RRC message.

An inter-UE coordination request message may be a physical layer message. For example, the inter-UE coordination request message may be included in SCI (e.g., $1^{st}$-stage SCI, or $2^{nd}$-stage SCI). As another example, the inter-UE coordination request message may be multiplexed in a PSSCH (for example, the inter-UE coordination request message and $2^{nd}$-stage SCI and/or an SL-SCH may be multiplexed in the same PSSCH transmission). As another example, the inter-UE coordination request message may be multiplexed in a PSCCH (for example, the inter-UE coordination request message and $1^{st}$-stage SCI may be multiplexed in the same PSCCH transmission).

An inter-UE coordination request message may be a higher layer (e.g., the MAC layer, or the RRC layer) message. For example, the inter-UE coordination request message may be carried in a MAC CE. As another example, the inter-UE coordination request message may be an RRC message.

A coordination resource indicated in an inter-UE coordination message may be determined by means of one or more SCIs detected on an SL (e.g., one or more SCIs detected in operations such as "sensing"). For example, it is determined according to a plurality of SCIs that a resource has been reserved by a plurality of other UEs. As another example, it is determined according to a plurality of SCIs that resources reserved by a plurality of other UEs overlap with each other (e.g., overlapping on one or more REs).

The inter-UE coordination function may be activated (or "enabled", or "configured") or deactivated (or disabled) by means of a higher layer protocol parameter (e.g., referred to as sl-ueCoordConfig). For example, if the parameter sl-ueCoordConfig is not present (or not configured), it is indicated that the inter-UE coordination function is not activated. As another example, if the parameter sl-ueCoord-Config is present (or configured), it is indicated that the inter-UE coordination function is activated. As another example, if the value of the parameter sl-ueCoordConfig (or a certain parameter in an information element corresponding to the parameter sl-ueCoordConfig) is a predefined value (e.g., "disabled", "false", or the like), it is indicated that the inter-UE coordination function is not activated. As another example, if the value of the parameter sl-ueCoordConfig (or a certain parameter in an information element corresponding to the parameter sl-ueCoordConfig) is a predefined value (e.g., "enabled", "true", or the like), it is indicated that the inter-UE coordination function is activated.

Embodiment 1

A method performed by user equipment according to Embodiment 1 of the present invention will be described below with reference to FIG. 1.

FIG. 1 is a flowchart showing a method performed by user equipment according to Embodiment 1 of the present invention.

As shown in FIG. 1, in Embodiment 1 of the present invention, the steps performed by the user equipment (UE) include: step S101 and step S103.

Specifically, in step S101, an inter-UE coordination message is determined. For example, the value of one or more fields in the inter-UE coordination message is determined.

Optionally, the inter-UE coordination message may indicate $$N_{in}^{SL}$$

resources (for example, denoted as a resource set $$R_{in}^{SL} = \left\{ r_0^{SL,in}, r_1^{SL,in}, \ldots, r_{N_{in}^{SL}-1}^{SL,in} \right\}$$

related to inter-UE coordination. In addition, if a slot where a resource $r_j^{SL,in}$ is located is denoted as $$t_{\gamma(j)}^{SL,in},$$

then a slot set corresponding to the set $$R_{in}^{SL} \text{ is } T_{in}^{SL} = \left\{ t_{\gamma(0)}^{SL,in}, t_{\gamma(1)}^{SL,in}, \ldots, t_{\gamma(N_{in}^{SL}-1)}^{SL,in} \right\}.$$

Optionally, $$N_{in}^{SL}$$

may be an integer greater than or equal to zero. Optionally, if $$N_{in}^{SL} = 0,$$

then the set $$R_{in}^{SL}$$

is an empty set (for example, denoted as $$R_{in}^{SL} = \phi).$$

Optionally, $$N_{in}^{SL}$$

may be an integer greater than or equal to one.
Optionally, $$N_{in}^{SL}$$

may be a predefined or configured or pre-configured value. For example, $$N_{in}^{SL} = 4.$$

As another example, $$N_{in}^{SL} = 6.$$

As another example, $$N_{in}^{SL} = 8.$$

Optionally, $$N_{in}^{SL} \leq N_{in,max}^{SL}. \ N_{in,max}^{SL}$$

may be a predefined or configured or pre-configured value. For example, $$N_{in,max}^{SL} = 3.$$

As another example, $$N_{in,max}^{SL} = 4.$$

As another example, $$N_{in,max}^{SL} = 5.$$

As another example, $$N_{in,max}^{SL} = 6.$$

As another example, $$N_{in,max}^{SL} = 8.$$

Optionally, resources $$r_0^{SL,in}, r_1^{SL,in}, \ldots, r_{SL,in-1}^{SL,in}$$

are arranged in chronological order. Correspondingly, $$t_{y(0)}^{SL,in} < t_{y(1)}^{SL,in} < \ldots < t_{y(N_{in}^{SL}-1)}^{SL,in}.$$

Optionally, for one or more integers j satisfying $$0 \leq j < N_{in}^{SL},$$

the resource $$r_j^{SL,in}$$

may be represented by only a time-domain resource (i.e., a corresponding slot $$t_{y(i)}^{SL,in}),$$

or the resource $$r_j^{SL,in}$$

may correspond to a set of all possible sub-channels (e.g., a set corresponding to any one or more consecutive sub-channels) in the frequency domain in the slot $$t_{y(i)}^{SL,in}.$$

Optionally, time domain information of the $$N_{in}^{SL}$$

resources is indicated by a field referred to as "time resource information".

Optionally, frequency domain information of the $$N_{in}^{SL}$$

resources is indicated by a field referred to as "frequency resource information".

The slot $$t_{y(0)}^{SL,in}, t_{y(1)}^{SL,in}, \ldots, t_{y(N_{in}^{SL}-1)}^{SL,in}$$

may belong to a "reference slot set" (for example, the slots $$t_{y(0)}^{SL,in}, t_{y(1)}^{SL,in}, \ldots, t_{y(N_{in}^{SL}-1)}^{SL,in}$$

may be respectively represented by indexes thereof in the reference slot set where applicable). For example, the $$N_{in}^{SL}$$

resources may be in the same resource pool (for example, denoted as u), and correspondingly, the reference slot set may be a slot set $$T_u^{Sl} = \left\{ t_0^{SL,u}, t_1^{SL,u}, \ldots, t_{T_{max}^\mu - 1}^{SL,u} \right\}$$

of the resource pool u. As another example, the $$N_{in}^{SL}$$

resources may be in different resource pools, and correspondingly, the reference slot set may be the set of the "SL slots"

$$T_{all}^{SL} = \left\{ t_0^{SL}, t_1^{SL}, \ldots, t_{T_{max}-1}^{SL} \right\},$$

or the reference slot set may be the set of all the slots $T_{all} = \{0, 1, \ldots, 10240 \times 2^{\mu_{SL}} - 1\}$.

Optionally, the "time resource information" field consists of several $$\left( e.g., \ N_{co,tv}^{SL} \right)$$

time resource indication values (TRIVs, or time resource indicator values, or time RIVs), for example, consists of $$N_{co,tv,1}^{SL}$$

type-1 TRIVs (for example, respectively denoted as $$tv_0^{SL,co,1}, tv_0^{SL,co,1}, \ldots, tv_{N_{co,tv,1}^{SL}-1}^{SL,co,1}) \text{ and/or } N_{co,tv,2}^{SL}$$

type-2 TRIVs (for example, respectively denoted as $$tv_0^{SL,co,2}, tv_1^{SL,co,2}, \ldots, tv_{N_{co,tv,2}^{SL}-1}^{SL,co,2}).$$

wherein

Optionally, $$N_{co,tv}^{SL} = N_{co,tv,1}^{SL} + N_{co,tv,2}^{SL}.$$

Optionally, $$N_{co,tv,1}^{SL}$$

may be an integer greater than or equal to zero.

Optionally, $$N_{co,tv,2}^{SL}$$

may be an integer greater than or equal to zero.

Optionally, the "time resource information" field consists of the $$N_{co,tv,1}^{SL}$$

type-1 TRIVs, and correspondingly, the order of appearance (or placement) of the TRIVs in the "time resource information" field is $$tv_0^{SL,co,1}, tv_1^{SL,co,1}, \ldots, tv_{N_{co,tv,1}^{SL}-1}^{SL,co,1}.$$

Optionally, the "time resource information" field consists of the $$N_{co,tv,2}^{SL}$$

type-2 TRIVs, and correspondingly, the order of appearance (or placement) of the TRIVs in the "time resource information" field is $$tv_0^{SL,co,2}, tv_1^{SL,co,2}, \ldots, tv_{N_{co,tv,2}^{SL}-1}^{SL,co,2}.$$

Optionally, the "time resource information" field consists of the $$N_{co,tv,1}^{SL}$$

type-1 TRIVs and the $$N_{co,tv,2}^{SL}$$

type-2 TRIVs, and correspondingly, the order of appearance (or placement) of the TRIVs in the "time resource information" field is $$tv_0^{SL,co,1}, tv_1^{SL,co,1}, \dots, tv_{N_{co,tv,1}^{SL}-1}^{SL,co,1}, tv_0^{SL,co,2}, tv_1^{SL,co,2}, \dots, tv_{N_{co,tv,2}^{SL}-1}^{SL,co,2}.$$

Optionally, in the "time resource information" field, the time indicated by a TRIV that appears (or, is placed) earlier is earlier than the time indicated by a TRIV that appears (or, is placed) later.

Optionally, $$N_{co,tv,1}^{SL}$$

are, may be determined in one of the following manners:

Optionally, $$N_{co,tv,1}^{SL}$$

is a predefined or configured or pre-configured constant. For example, $$N_{co,tv,1}^{SL} = 0.$$

As another example, $$N_{co,tv,1}^{SL} = 1.$$

As another example, $$N_{co,tv,1}^{SL} = 2.$$

As another example, $$N_{co,tv,1}^{SL} = 3.$$

As another example, $$N_{co,tv,1}^{SL} = 4.$$

As another example, $$N_{co,tv,1}^{SL} = 5.$$

As another example, $$N_{co,tv,1}^{SL} = 6.$$

$$N_{co,tv,1}^{SL} = N_{in}^{SL}/M_1.$$

For example, $M_1 = 2$, and correspondingly, $$N_{co,tv,1}^{SL} = N_{in}^{SL}/2.$$

$$N_{co,tv,1}^{SL} = N_{in,max}^{SL}/M_1$$

For example, $M_1 = 2$, and correspondingly, $$N_{co,tv,1}^{SL} = N_{in,max}^{SL}/2.$$

$$N_{co,tv,1}^{SL} = \left\lfloor N_{in}^{SL}/M_1 \right\rfloor.$$

For example, $M_1 = 2$, and correspondingly, $$N_{co,tv,1}^{SL} = \left\lfloor N_{in}^{SL}/2 \right\rfloor.$$

$$N_{co,tv,1}^{SL} = \left\lfloor N_{in,max}^{SL}/M_1 \right\rfloor.$$

For example, $M_1 = 2$, and correspondingly, $$N_{co,tv,1}^{SL} = \left\lfloor N_{in,max}^{SL}/2 \right\rfloor.$$

$$N_{co,tv,1}^{SL} = \left\lceil N_{in}^{SL}/M_1 \right\rceil.$$

For example, $M_1=2$, and correspondingly, $$N_{co,tv,1}^{SL} = \lceil N_{in}^{SL}/2 \rceil.$$

$$N_{co,tv,1}^{SL} = \lceil N_{in,max}^{SL}/M_1 \rceil.$$

For example, $M_1=2$, and correspondingly, $$N_{co,tv,1}^{SL} = \lceil N_{in,max}^{SL}/2 \rceil.$$

If $$N_{in}^{SL} \bmod M_1 = 0, \text{ then } N_{co,tv,1}^{SL} = N_{in}^{SL}/M_1.$$

For example, $M_1=2$, and correspondingly, if $$N_{in}^{SL}$$

mod 2=0 (or, if $$N_{in}^{SL}$$

is an even number), then $$N_{co,tv,1}^{SL} = N_{in}^{SL}/2.$$

If $$N_{in,max}^{SL}$$

mod $M_1$=0, then $$N_{co,tv,1}^{SL} = N_{in,max}^{SL}/M_1.$$

For example, $M_1=2$, and correspondingly, if $$N_{in,max}^{SL} \bmod 2 = 0$$

(or, if $$N_{in,max}^{SL}$$

is an even number), then $$N_{co,tv,1}^{SL} = N_{in,max}^{SL}/2.$$

If $$N_{in}^{SL} \bmod M_1 \neq 0 \left(\text{or, if } N_{in}^{SL} \bmod M_1 > 0\right), \text{ then } N_{co,tv,1}^{SL} = \lfloor N_{in}^{SL}/M_1 \rfloor.$$

For example, $M_1=2$, and correspondingly, if $$N_{in}^{SL} \bmod 2 \neq 0$$

$\left(\text{or if } N_{in}^{SL} \bmod 2 > 0, \text{ or if } N_{in}^{SL} \bmod 2 = 1, \text{ or if } N_{in}^{SL} \text{ is an odd number}\right),$ then $$N_{co,tv,1}^{SL} = \lfloor N_{in}^{SL}/2 \rfloor.$$

If $$N_{in,max}^{SL} \bmod M_1 \neq 0 \left(\text{or, if } N_{in,max}^{SL} \bmod M_1 > 0\right),$$

$$\text{then } N_{co,tv,1}^{SL} = \lfloor N_{in,max}^{SL}/M_1 \rfloor.$$

For example, $M_1=2$, and correspondingly, if $$N_{in,max}^{SL} \bmod 2 \neq 0$$

(or if $$N_{in,max}^{SL} \bmod 2 > 0, \text{ or if } N_{in,max}^{SL} \bmod 2 = 1, \text{ or if } N_{in,max}^{SL} \text{ is an odd number}),$$

$$\text{then } N_{co,tv,1}^{SL} = \lfloor N_{in,max}^{SL}/2 \rfloor.$$

If $N_{in}^{SL} \bmod M_1 \neq 0$, $\left(\text{or, if } N_{in}^{SL} \bmod M_1 > 0\right)$, then $N_{co,tv,1}^{SL} = \lceil N_{in}^{SL}/M_1 \rceil$. For example, $M_1 = 2$, and correspondingly, if $N_{in}^{SL} \bmod 2 \neq 0 \left(\text{or if } N_{in}^{SL} \bmod 2 > 0, \text{ or if } N_{in}^{SL} \bmod 2 = 1, \text{ or if } N_{in}^{SL} \text{ is an odd number}\right)$, then $N_{co,tv,1}^{SL} = \lceil N_{in}^{SL}/2 \rceil$.

If $N_{in,max}^{SL} \bmod M_1 \neq 0$, $\left(\text{or, if } N_{in,max}^{SL} \bmod M_1 > 0\right)$, then $N_{co,tv,1}^{SL} = \lceil N_{in,max}^{SL}/M_1 \rceil$. For example, $M_1 = 2$, and correspondingly, if $N_{in,max}^{SL} \bmod 2 \neq 0 \left(\text{or if } N_{in,max}^{SL} \bmod 2 > 0, \text{ or if } N_{in,max}^{SL} \bmod 2 = 1, \text{ or if } N_{in,max}^{SL} \text{ is an odd number}\right)$, then $N_{co,tv,1}^{SL} = \lceil N_{in,max}^{SL}/2 \rceil$.

Optionally, $$N_{co,tv,2}^{SL}$$

Optionally, $N_{co,rv,2}^{SL}$ is a predefined or configured or pre-configured constant. For example, $N_{co,rv,2}^{SL} = 0$. As another example, $N_{co,rv,2}^{SL} = 1$. As another example, $N_{co,rv,2}^{SL} = 2$. As another example, $N_{co,rv,2}^{SL} = 3$. As another example, $N_{co,rv,2}^{SL} = 4$. As another example, $N_{co,rv,2}^{SL} = 5$. As another example, $N_{co,rv,2}^{SL} = 6$. If $N_{in}^{SL} \bmod M_1 = 0$, then $N_{co,rv,2}^{SL} = 0$. For example, $M_1 = 2$, and correspondingly, if $N_{in}^{SL} \bmod 2 = 0$ (or, if $N_{in}^{SL}$ is an even number), then $N_{co,rv,2}^{SL} = 0$. If $N_{in,max}^{SL} \bmod M_1 = 0$, then $N_{co,rv,2}^{SL} = 0$. For example, $M_1 = 2$, and correspondingly, if $N_{in,max}^{SL} \bmod 2 = 0$ (or, if $N_{in,max}^{SL}$ is an even number), then $N_{co,rv,2}^{SL} = 0$. If $N_{in}^{SL} \bmod M_1 \neq 0$ (or, if $N_{in}^{SL} \bmod M_1 > 0$), then $N_{co,rv,2}^{SL} = \lceil (N_{in}^{SL} - \lfloor N_{in}^{SL}/M_1 \rfloor)/M_2 \rceil$. For example, $M_1 = 2$, $M_2 = 1$, and correspondingly, if $N_{in}^{SL} \bmod 2 \neq 0$ (or if $N_{in}^{SL} \bmod 2 > 0$, or if $N_{in}^{SL} \bmod 2 = 1$, or if $N_{in}^{SL}$ is an odd number), then $N_{co,rv,2}^{SL} = \lceil (N_{in}^{SL} - \lfloor N_{in}^{SL}/2 \rfloor \cdot 2)/1 \rceil =$ 1. If $N_{in,max}^{SL} \bmod M_1 \neq 0$ (or, if $N_{in,max}^{SL} \bmod M_1 > 0$), then $N_{co,rv,2}^{SL} = \lceil (N_{in,max}^{SL} - \lfloor N_{in,max}^{SL}/M_1 \rfloor \cdot M_1)/M_2 \rceil$. For example, $M_1 = 2$, $M_2 = 1$, and correspondingly, if $N_{in,max}^{SL} \bmod 2 \neq 0$ (or if $N_{in,max}^{SL} \bmod 2 > 0$, or if $N_{in,max}^{SL} \bmod 2 = 1$, or if $N_{in,max}^{SL}$ is an odd number), then $N_{co,rv,2}^{SL} = \lceil (N_{in,max}^{SL} - \lfloor N_{in,max}^{SL}/2 \rfloor \cdot 2)/1 \rceil =$ 1. If $N_{in}^{SL} \bmod M_1 \neq 0$ (or, if $N_{in}^{SL} \bmod M_1 > 0$), then $N_{co,rv,2}^{SL} = \lceil (N_{in}^{SL} \bmod M_1)/M_2 \rceil$. For example, $M_1 = 2$, $M_2 = 1$, and correspondingly, if $N_{in}^{SL} \bmod 2 \neq 0$ (or if $N_{in}^{SL} \bmod 2 > 0$, or if $N_{in}^{SL} \bmod 2 = 1$, or if $N_{in}^{SL}$ is an odd number), then $N_{co,rv,2}^{SL} = \lceil (N_{in}^{SL} \bmod 2)/1 \rceil =$ 1. If $N_{in,max}^{SL} \bmod M_1 \neq 0$ (or, if $N_{in,max}^{SL} \bmod M_1 > 0$), then $N_{co,rv,2}^{SL} = \lceil (N_{in,max}^{SL} \bmod M_1)/M_2 \rceil$. For example, $M_1 = 2$, $M_2 = 1$, and correspondingly, if $N_{in,max}^{SL} \bmod 2 \neq 0$ (or if $N_{in,max}^{SL} \bmod 2 > 0$, or if $N_{in,max}^{SL} \bmod 2 = 1$, or if $N_{in,max}^{SL}$ is an odd number), then $N_{co,rv,2}^{SL} = \lceil (N_{in,max}^{SL} \bmod 2)/1 \rceil = 1$.

Optionally, a type-1 TRIV may indicate time domain information respectively corresponding to $m_1$ resources. For example, $$ tv_{k_1}^{SL,co,1} \ (0 \leq k_1 < N_{co,rv,1}^{SL}) $$

may indicate $m_1$ slots (for example, respectively denoted as $$ t_{k_1,0}^{SL,co,rv,1}, t_{k_1,1}^{SL,co,rv,1}, \ldots, t_{k_1,m_1-1}^{SL,co,rv,1}). $$

For example, in the set consisting of all TRIV values, a subset consisting of one or more values corresponds to $m_1=0$ (for example, the one or more values are used to indicate that the corresponding TRIV does not indicate any resource-corresponding slot). As another example, in the set consisting of all the TRIV values, a subset consisting of one or more values corresponds to $m_1=1$ (for example, the one or more values are respectively used to indicate one or more values of a slot corresponding to one resource). As another example, in the set consisting of all the TRIV values, a subset consisting of one or more values corresponds to $m_1=2$ (for example, the one or more values are respectively used to indicate one or more combinations of slots respectively corresponding to two resources). wherein Optionally, $m_1$ may be one of one or more values satisfying $0 \leq m_1 \leq M_1$, wherein optionally, $M_1$ may be a predefined or configured or pre-configured value. For example, $M_1=1$. As another example, $M_1=2$. As another example, $M_1=3$. As another example, $M_1=4$. As another example, $M_1=5$. As another example, $M_1=6$.

Optionally, $m_1$ may be related to $k_1$. For example, for different values of $k_1$, the values of $m_1$ corresponding to $$ tv_{k_1}^{SL,co,1} $$

may be different.

Optionally, the $m_1$ slots $$ t_{k_1,0}^{SL,co,rv,1}, t_{k_1,1}^{SL,co,rv,1}, \ldots, t_{k_1,m_1-1}^{SL,co,rv,1} $$

are arranged in chronological order, i.e., $$ t_{k_1,0}^{SL,co,rv,1} < t_{k_1,1}^{SL,co,rv,1} < \ldots < t_{k_1,m_1-1}^{SL,co,rv,1}. $$

Optionally, a type-2 TRIV may indicate time domain information respectively corresponding to $m_2$ resources. For example, $$ tv_{k_2}^{SL,co,2} (0 \leq k_2 < N_{co,rv,2}^{SL}) $$

may indicate $m_2$ slots (for example, respectively denoted as $$ t_{k_2,0}^{SL,co,rv,2}, t_{k_2,1}^{SL,co,rv,2}, \ldots, t_{k_2,m_2-1}^{SL,co,rv,2}). $$

For example, in the set consisting of all the TRIV values, a subset consisting of one or more values corresponds to $m_2=0$ (for example, the one or more values are used to indicate that the corresponding TRIV does not indicate any resource-corresponding slot). As another example, in the set consisting of all the TRIV values, a subset consisting of one or more values corresponds to $m_2=1$ (for example, the one or more values are respectively used to indicate one or more values of a slot corresponding to one resource). As another example, in the set consisting of all the TRIV values, a subset consisting of one or more values corresponds to $m_2=2$ (for example, the one or more values are respectively used to indicate one or more combinations of slots respectively corresponding to two resources). wherein Optionally, $m_2$ may be one of one or more values satisfying $0 \leq m_2 \leq M_2$, wherein optionally, $M_2$ may be a predefined or configured or pre-configured value. For example, $M_2=1$. As another example, $M_2=2$. As another example, $M_2=3$. As another example, $M_2=4$. As another example, $M_2=5$. As another example, $M_2=6$.

Optionally, $m_2$ may be related to $k_2$. For example, for different values of $k_2$, the values of $m_2$ corresponding to $$tv_{k_2}^{SL,co,2}$$

may be different.

Optionally, the $m_2$ slots $$t_{k_2,0}^{SL,co,tv,2}, t_{k_2,1}^{SL,co,tv,2}, \ldots, t_{k_2,m_2-1}^{SL,co,tv,2}$$

are arranged in chronological order, i.e., $$t_{k_2,0}^{SL,co,tv,2} < t_{k_2,1}^{SL,co,tv,2} < \ldots < t_{k_2,m_2-1}^{SL,co,tv,2}.$$

Optionally, when the "time resource information" field consists of the $$N_{co,tv,1}^{SL}$$

type-1 TRIVs $$\left(tv_0^{SL,co,1}, tv_1^{SL,co,1}, \ldots, tv_{N_{co,tv,1}^{SL}-1}^{SL,co,1}\right),$$

Optionally, if a first independent resource condition is satisfied, then for the integer $k_1$ satisfying $$0 \le k_1 < \left\lfloor \frac{N_{in}^{SL}}{M_1} \right\rfloor$$

(or satisfying $$0 \le k_1 < \frac{N_{in}^{SL}}{M_1}\right), tv_{k_1}^{SL,co,1}$$

indicates $M_1$ slots $$t_{k_1,0}^{SL,co,tv,1}, t_{k_1,1}^{SL,co,tv,1}, \ldots, t_{k_1,M_1-1}^{SL,co,tv,1}.$$

Optionally, the $M_1$ slots $$\left(T_{k_1,0}^{SL,co,tv,1}, t_{k_1,1}^{SL,co,tv,1}, \ldots, t_{k_1,M_1-1}^{SL,co,tv,1}\right)$$

respectively correspond to slots $$t_{y(k_1,M_1)}^{SL,in}, t_{y(k_1,M_1+1)}^{SL,in}, \ldots, t_{y(k_1,M_1+M_1-1)}^{SL,in}$$

in the slot set $$T_{in}^{SL},$$

wherein the first independent resource condition may be absent (or, the first independent resource condition is always satisfied), or the first independent resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} > 0.$$

$$N_{in}^{SL} \ge 0.$$

$$N_{in}^{SL} - \left\lfloor \frac{N_{in}^{SL}}{M_1} \right\rfloor \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1 \text{ (For example, when } M_1 = 2.)$$

$$N_{in}^{SL} \bmod M_1 \ne 0.$$

$$N_{in}^{SL} \bmod M_1 > 0.$$

$$N_{in}^{SL} \bmod M_1 = 1. \text{ (For example, when } M_1 = 2.)$$

-continued $$N_{in}^{SL} - \left\lfloor \frac{N_{in}^{SL}}{M_1} \right\rfloor \cdot M_1 = 0.$$

$$N_{in}^{SL} \bmod M_1 = 0.$$

Optionally, if a second independent resource condition is satisfied, then for $$k_1 = \left\lfloor \frac{N_{in}^{SL}}{M_1} \right\rfloor, \, tv_{k_1}^{SL,co,1} \text{ indicates } N_{in}^{SL} - \left\lfloor N_{in}^{SL}/M_1 \right\rfloor \cdot M_1$$

slots $$\left( t_{k_1,0}^{SL.co.tv.1}, t_{k_1,1}^{SL.co.tv.1}, \ldots, t_{k_1, N_{in}^{SL} \ldots \lfloor N_{in}^{SL}/M_1 \rfloor \cdot M_1 \ldots 1}^{SL.co.tv.1} \right).$$

Optionally, the $$N_{in}^{SL} - \left\lfloor N_{in}^{SL}/M_1 \right\rfloor \cdot M_1 \text{ slots } \left( t_{k_1,0}^{SL.co.tv.1}, t_{k_1,1}^{SL.co.tv.1}, \ldots, t_{k_1, N_{in}^{SL} - \lfloor N_{in}^{SL}/M_1 \rfloor \cdot M_1 - 1}^{SL.co.tv.1} \right)$$

respectively correspond to slots $$t_{y_{(\lfloor N_{in}^{SL}/M_1 \rfloor \cdot M_1)}}^{SL.in}, t_{y_{(\lfloor N_{in}^{SL}/M_1 \rfloor \cdot M_1 + 1)}}^{SL.in}, \ldots, t_{y_{(\lfloor N_{in}^{SL} - 1)}}^{SL.in}$$

in the slot set $$T_{in}^{SL},$$

wherein the second independent resource condition may be absent (or, the second independent resource condition is always satisfied), or the second independent resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1}^{SL} \cdot M_1.$$

-continued $$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} > 0.$$

$$N_{in}^{SL} \ge 0.$$

$$N_{in}^{SL} - \left\lfloor \frac{N_{in}^{SL}}{M_1} \right\rfloor \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1. \text{ (For example, when } M_1 = 2.)$$

$$N_{in}^{SL} \bmod M_1 \ne 0.$$

$$N_{in}^{SL} \bmod M_1 > 0.$$

$$N_{in}^{SL} \bmod M_1 = 1. \text{ (For example, when } M_1 = 2.)$$

Optionally, if a third independent resource condition is satisfied, then for $$k_1 = \left\lfloor \frac{N_{in}^{SL}}{M_1} \right\rfloor,$$

$tv_{k_1}^{SL,co,1}$ indicates $$N_{in}^{SL}$$

mod $M_1$ slots $$\left( t_{k_1,0}^{SL.co.tv.1}, t_{k_1,1}^{SL.co.tv.1}, \ldots, t_{k_1 \cdot \left( N_{in}^{SL} \bmod M_1 \right) - 1}^{SL.co.tv.1} \right).$$

For example, the $$N_{in}^{SL}$$

mod $M_1$ slots $$\left( t_{k_1,0}^{SL,co,tv,1}, t_{k_1,1}^{SL,co,tv,1}, \ldots, t_{k_1 \cdot (N_{in}^{SL} \bmod M_1)-1}^{SL,co,tv,1} \right)$$

respectively correspond to slots $$t_{y \cdot (\lfloor N_{in}^{SL}/M_1 \rfloor M_1)}^{SL,in}, t_{y \cdot (\lfloor N_{in}^{SL}/M_1 \rfloor \cdot M_1+1)}^{SL,in}, \ldots, t_{k_1,(N_{in}^{SL}-1)}^{SL,in}$$

in the slot set $$T_{in}^{SL},$$

wherein the third independent resource condition may be absent (or, the third independent resource condition is always satisfied), or the third independent resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} > 0.$$

-continued $$N_{in}^{SL} \ge 0.$$

$$N_{in}^{SL} - \left\lfloor \frac{N_{in}^{SL}}{M_1} \right\rfloor \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1. \text{ (For example, when } M_1 = 2.)$$

$$N_{in}^{SL} \bmod M_1 \ne 0.$$

$$N_{in}^{SL} \bmod M_1 > 0.$$

$$N_{in}^{SL} \bmod M_1 = 1 \text{ (For example, when } M_1 = 2.)$$

Optionally, if a fourth independent resource condition is satisfied, then for $$k_1 = \left\lfloor \frac{N_{in}^{SL}}{M_1} \right\rfloor, tv_{k_1}^{SL,co,1}$$

does not indicate any resource-corresponding slot. The fourth independent resource condition may be absent (or, the fourth independent resource condition is always satisfied), or the fourth independent resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

-continued $$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} > 0.$$

$$N_{in}^{SL} \geq 0.$$

$$N_{in}^{SL} - \left\lfloor \frac{N_{in}^{SL}}{M_1} \right\rfloor \cdot M_1 = 0.$$

$$N_{in}^{SL} \bmod M_1 = 0.$$

Optionally, if a fifth independent resource condition is satisfied, then for the integer $k_1$ satisfying $$\left\lfloor \frac{N_{in}^{SL}}{M_1} \right\rfloor < k_1 < N_{co,tv,1}^{SL}$$

(or satisfying $$\left\lfloor \frac{N_{in}^{SL}}{M_1} \right\rfloor \leq k_1 < N_{co,tv,1}^{SL},$$

or satisfying $$\frac{N_{in}^{SL}}{M_1} < k_1 < N_{co,tv,1}^{SL},$$

or satisfying $$\frac{N_{in}^{SL}}{M_1} \leq k_1 < N_{co,tv,1}^{SL},$$

or satisfying $$\left\lfloor \frac{N_{in}^{SL}}{M_1} \right\rfloor < k_1 < N_{co,tv,1,max}^{SL},$$

or satisfying $$\left\lfloor \frac{N_{in}^{SL}}{M_1} \right\rfloor \leq k_1 < N_{co,tv,1,max}^{SL},$$

or satisfying $$\frac{N_{in}^{SL}}{M_1} < k_1 < N_{co,tv,1,max}^{SL},$$

or satisfying $$\frac{N_{in}^{SL}}{M_1} \leq k_1 < N_{co,tv,1,max}^{SL} \Biggr),$$

$tv_{k_1}^{SL,co,1}$ does not indicate any resource-corresponding slot. The fifth independent resource condition may be absent (or, the fifth independent resource condition is always satisfied), or the fifth independent resource condition may include one or more of the following (in any combination of "and" or "or" where applicable):

$$N_{in}^{SL} \leq N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \leq N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \leq N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \leq N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \leq N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \leq N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} > 0.$$

$$N_{in}^{SL} \geq 0.$$

$$\left\lfloor \frac{N_{in}^{SL}}{M_1} \right\rfloor < N_{co,tv,1,max}^{SL} - 1.$$

$$\left\lfloor \frac{N_{in}^{SL}}{M_1} \right\rfloor \leq N_{co,tv,1,max}^{SL} - 2.$$

$$\frac{N_{in}^{SL}}{M_1} < N_{co,tv,1,max}^{SL} - 1.$$

$$\frac{N_{in}^{SL}}{M_1} \leq N_{co,tv,1,max}^{SL} - 2.$$

$$\left\lfloor \frac{N_{in}^{SL}}{M_1} \right\rfloor < N_{co,tv,1}^{SL} - 1.$$

$$\left\lfloor \frac{N_{in}^{SL}}{M_1} \right\rfloor \leq N_{co,tv,1}^{SL} - 2.$$

-continued $$\frac{N_{in}^{SL}}{M_1} < N_{co,tv,1}^{SL} - 1.$$

$$\frac{N_{in}^{SL}}{M_1} \le N_{co,tv,1}^{SL} - 2.$$

$$N_{in}^{SL} - \left\lfloor \frac{N_{in}^{SL}}{M_1} \right\rfloor \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1. \text{ (For example, when } M_1 = 2.)$$

$$N_{in}^{SL} \bmod M_1 \ne 0.$$

$$N_{in}^{SL} \bmod M_1 > 0.$$

$$N_{in}^{SL} \bmod M_1 = 1. \text{ (For example, when } M_1 = 2.)$$

$$N_{in}^{SL} - \left\lfloor \frac{N_{in}^{SL}}{M_1} \right\rfloor \cdot M_1 = 0.$$

$$N_{in}^{SL} \bmod M_1 = 0.$$

Optionally, when the "time resource information" field consists of the $$N_{co,tv,1}^{SL}$$

type-1 TRIVs $$\left( tv_0^{SL,co,1}, tv_1^{SL,co,1}, \ldots, tv_{N_{co,tv,1}^{SL}-1}^{SL,co,1} \right) \text{ and the } N_{co,tv,2}^{SL}$$

type-2 TRIVs $$\left( tv_0^{SL,co,2}, tv_1^{SL,co,2}, \ldots, tv_{N_{co,tv,1}^{SL}-1}^{SL,co,2} \right),$$

Optionally, if a first joint resource condition is satisfied, then for the integer $k_1$ satisfying $$0 \le k_1 < \left\lfloor \frac{N_{in}^{SL}}{M_1} \right\rfloor$$

(or satisfying $$0 \le k_1 < \frac{N_{in}^{SL}}{M_1} \right), tv_{k_1}^{SL,co,1}$$

indicates $M_1$ slots $$\left( T_{k_1,0}^{SL,co,tv,1}, t_{k_1,1}^{SL,co,tv,1}, \ldots, t_{k_1,M_1-1}^{SL,co,tv,1} \right).$$

Optionally, the $M_1$ slots $$\left( t_{k_1,0}^{SL,co,tv,1}, t_{k_1,1}^{SL,co,tv,1}, \ldots, t_{k_1,M_1-1}^{SL,co,tv,1} \right)$$

respectively correspond to slots $$t_{y(k_1 M_1)}^{SL,in}, t_{y(k_1 M_1+1)}^{SL,in}, \ldots, t_{y(k_1 \cdot M_1+M_1-1)}^{SL,in}$$

in the slot set $$T_{in}^{SL},$$

wherein the first joint resource condition may be absent (or, the first joint resource condition is always satisfied), or the first joint resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

-continued $$\frac{N_{in}^{SL}}{M_1} = N_{co,tv,1}^{SL}.$$

$$N_{in}^{SL} \le N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \ge 0.$$

Optionally, if a second joint resource condition is satisfied, then for $$k_1 = \left\lfloor \frac{N_{in}^{SL}}{M_1} \right\rfloor, tv_{k_1}^{SL,co,1}$$

indicates $$N_{in}^{SL} - \left\lfloor \frac{N_{in}^{SL}}{M_1} \right\rfloor \cdot M_1$$

slots $$\left( t_{k_1,0}^{SL,co,tv,1}, t_{k_1,1}^{SL,co,tv,1}, \ldots, t_{k_1, N_{in}^{SL} - \lfloor N_{in}^{SL}/M_1 \rfloor \cdot M_1 - 1}^{SL,co,tv,1} \right).$$

Optionally, the $$N_{in}^{SL} - \lfloor N_{in}^{SL}/M_1 \rfloor \cdot M_1$$

slots $$\left( t_{k_1,0}^{SL,co,tv,1}, t_{k_1,1}^{SL,co,tv,1}, \ldots, t_{k_1, N_{in}^{SL} - \lfloor N_{in}^{SL}/M_1 \rfloor \cdot M_1 - 1}^{SL,co,tv,1} \right)$$

respectively correspond to slots $$t_{y(\lfloor N_{in}^{SL}/M_1 \rfloor M_1)}^{SL,in}, t_{y(\lfloor N_{in}^{SL}/M_1 \rfloor M_1 + 1)}^{SL,in}, \ldots, t_{y(N_{in}^{SL}-1)}^{SL,in}$$

in the slot set $$T_{in}^{SL},$$

wherein the second joint resource condition may be absent (or, the second joint resource condition is always satisfied), or the second joint resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

-continued $$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} \le N_{co,tv,1}^{SL} \cdot M_1 + N_{co,tv,2}^{SL} \cdot M_2.$$

$$N_{in}^{Sl} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \ge 0.$$

$$N_{in}^{Sl} - \left\lfloor \frac{N_{in}^{SL}}{m_1} \right\rfloor \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1. \text{ (For example, when } M_1 = 2)$$

$$N_{in}^{SL} \bmod M_1 \ne 0.$$

$$N_{in}^{SL} \bmod M_1 > 0.$$

$$N_{in}^{SL} \bmod M_1 = 1 \text{ (For example, when } M_1 = 2)$$

US 12,652,657 B2

51

Optionally, if a third joint resource condition is satisfied, then for $$k_1 = \left\lfloor \frac{N_{in}^{SL}}{M_1} \right\rfloor, \; tv_{k_1}^{SL,co,1}$$

indicates $$N_{in}^{SL} \bmod M_1 \text{ slots } \left( t_{k_1,0}^{SL,co,tv,1}, t_{k_1,1}^{SL,co,tv,1}, \ldots, t_{k_1,(N_{in}^{SL} \bmod M_1)-1}^{SL,co,tv,1} \right).$$

For example, the $$N_{in}^{SL} \bmod M_1 \text{ slots } \left( t_{k_1,0}^{SL,co,tv,1}, t_{k_1,1}^{SL,co,tv,1}, \ldots, t_{k_1,(N_{in}^{SL} \bmod M_1)-1}^{SL,co,tv,1} \right)$$

respectively correspond to slots $$t_{y(\lfloor N_{in}^{SL}/M_1 \rfloor M_1)}^{SL,in}, t_{y(\lfloor N_{in}^{SL}/M_1 \rfloor M_1 + 1)}^{SL,in}, \ldots, t_{y(N_{in}^{SL}-1)}^{SL,in}$$

in the slot set $$T_{in}^{SL},$$

wherein the third joint resource condition may be absent (or, the third joint resource condition is always satisfied), or the third joint resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \le N_{co,tv,1}^{SL} \cdot M_1.$$

$$N_{in}^{SL} < N_{co,tv,1}^{SL} \cdot M_1.$$

52

-continued $$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} = N_{co,tv,1}^{SL}.$$

$$N_{in}^{SL} \le N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{Sl} \ge 0.$$

$$N_{in}^{SL} - \left\lfloor \frac{N_{in}^{SL}}{M_1} \right\rfloor \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1 \text{ (For example, when } M_1 = 2)$$

$$N_{in}^{SL} \bmod M_1 \ne 0.$$

$$N_{in}^{SL} \bmod M_1 > 0.$$

$$N_{in}^{SL} \bmod M_1 = 1. \text{ (For example, when } M_1 = 2)$$

Optionally, if a fourth joint resource condition is satisfied, then for $$k_1 = \left\lfloor \frac{N_{in}^{SL}}{M_1} \right\rfloor, \; tv_{k_1}^{SL,co,1}$$

does not indicate any resource-corresponding slot. The fourth joint resource condition may be absent (or, the fourth joint resource condition is always satisfied), or the fourth joint resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

-continued $$\left\lfloor \frac{N_{in}^{SL}}{M_1} \right\rfloor = N_{co,tv,1,max}^{SL}.$$

$$\frac{N_{in}^{SL}}{M_1} \leq N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \leq N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} = N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \leq N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \leq N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} \leq N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \geq 0.$$

$$N_{in}^{SL} - \left\lfloor \frac{N_{in}^{SL}}{M_1} \right\rfloor \cdot M_1 = 0.$$

$$N_{in}^{SL} \bmod M_1 = 0.$$

Optionally, if a fifth joint resource condition is satisfied, then for the integer $k_1$ satisfying $$\left\lfloor \frac{N_{in}^{SL}}{M_1} \right\rfloor < k_1 < N_{co,tv,1}^{SL}$$

(or satisfying $$\left\lfloor \frac{N_{in}^{SL}}{M_1} \right\rfloor \leq k_1 < N_{co,tv,1}^{SL},$$

or satisfying $$\frac{N_{in}^{SL}}{M_1} < k_1 < N_{co,tv,1}^{SL},$$

or satisfying $$\frac{N_{in}^{SL}}{M_1} \leq k_1 < N_{co,tv,1}^{SL},$$

or satisfying $$\left\lfloor \frac{N_{in}^{SL}}{M_1} \right\rfloor < k_1 < N_{co,tv,1,max}^{SL},$$

or satisfying $$\left\lfloor \frac{N_{in}^{SL}}{M_1} \right\rfloor \leq k_1 < N_{co,tv,1,max}^{SL},$$

or satisfying $$\frac{N_{in}^{SL}}{M_1} < k_1 < N_{co,tv,1,max}^{SL},$$

or satisfying $$\frac{N_{in}^{SL}}{M_1} \leq k_1 < N_{co,tv,1,max}^{SL} \Big),$$

$tv_{k_1}^{SL,co,1}$ does not indicate any resource-corresponding slot. The fifth joint resource condition may be absent (or, the fifth joint resource condition is always satisfied), or the fifth joint resource condition may include one or more of the following (in any combination of "and" or "or" where applicable):

$$N_{in}^{SL} \leq N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \leq N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \leq N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

-continued $$N_{in}^{SL} \le N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} \le N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \ge 0.$$

$$\left\lfloor \frac{N_{in}^{SL}}{M_1} \right\rfloor < N_{co,tv,1}^{SL} - 1.$$

$$\left\lfloor \frac{N_{in}^{SL}}{M_1} \right\rfloor \le N_{co,tv,1}^{SL} - 2.$$

$$N_{in}^{SL} - \frac{N_{in}^{SL}}{M_1} \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1. \text{ (For example, when } M_2 = 2)$$

$$N_{in}^{SL} \bmod M_1 \ne 0.$$

$$N_{in}^{SL} \bmod M_1 > 0.$$

$$N_{in}^{SL} \bmod M_1 = 1. \text{ (For example, when } M_1 = 2)$$

$$N_{in}^{SL} - \left\lfloor \frac{N_{in}^{SL}}{M_1} \right\rfloor \cdot M_1 = 0.$$

$$N_{in}^{SL} \bmod M_1 = 0.$$

Optionally, if the first joint resource condition and/or the second joint resource condition and/or the third joint resource condition and/or the fourth joint resource condition and/or the fifth joint resource condition is satisfied, then for the integer $k_2$ satisfying $$0 \le k_2 < N_{co,tv,2}^{SL} (\text{or satisfying } 0 \le k_2 < N_{co,tv,2,max}^{SL}), \, tv_{k_2}^{SL,co,2}$$

does not indicate any resource-corresponding slot. Optionally, if a sixth joint resource condition is satisfied, then for the integer $k_2$ satisfying $$0 \le k_2 < N_{co,tv,2}^{SL} (\text{or satisfying } 0 \le k_2 < N_{co,tv,2,max}^{SL}), \, tv_{k_2}^{SL,co,2}$$

does not indicate any resource-corresponding slot. The sixth joint resource condition may be absent (or, the sixth joint resource condition is always satisfied), or the sixth joint resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\left\lfloor \frac{N_{in}^{SL}}{M_1} \right\rfloor < N_{co,tv,1}^{SL}.$$

$$\frac{N_{in}^{SL}}{M_1} = N_{co,tv,1}^{SL}.$$

$$N_{in}^{SL} > 0.$$

$$N_{in}^{SL} \ge 0.$$

$$N_{in}^{SL} - \left\lfloor \frac{N_{in}^{SL}}{M_1} \right\rfloor \cdot M_1 \ne 0.$$

$$N_{in}^{SL} - \left\lfloor \frac{N_{in}^{SL}}{M_1} \right\rfloor \cdot M_1 > 0.$$

$$N_{in}^{SL} - \left\lfloor \frac{N_{in}^{SL}}{M_1} \right\rfloor \cdot M_1 = 1. \text{ (For example, when } M_1 = 2.)$$

$$N_{in}^{SL} \bmod M_1 \ne 0.$$

-continued $$N_{in}^{SL} \bmod M_1 > 0.$$

$$N_{in}^{SL} \bmod M_1 = 1. \ (\text{For example, when } M_1 = 2.)$$

$$N_{in}^{SL} - \left\lfloor \frac{N_{in}^{SL}}{M_1} \right\rfloor \cdot M_1 = 0.$$

$$N_{in}^{SL} \bmod M_1 = 0.$$

Optionally, if a seventh joint resource condition is satisfied, then for the integer $k_2$ satisfying $$0 \le k_2 < \left\lfloor \left( N_{in}^{SL} - N_{co,tv,1}^{SL} \cdot M_1 \right)/M_2 \right\rfloor$$

$$\left(\text{or satisfying } 0 \le k_2 < \left\lfloor \left( N_{in}^{SL} - N_{co,tv,2,max}^{SL} \cdot M_1 \right)/M_2 \right\rfloor\right),$$

$tv_{k_2}^{SL,co,2}$ indicates $M_2$ slots $\left( t_{k_2,0}^{SL,co,tv,2}, t_{k_2,1}^{SL,co,tv,2}, \ldots, t_{k_2,M_2-1}^{SL,co,tv,2} \right)$. Optionally,
the $M_2$ slots $\left( t_{k_2,0}^{SL,co,tv,2}, t_{k_2,1}^{SL,co,tv,2}, \ldots, t_{k_2,M_2-1}^{SL,co,tv,2} \right)$ respectively correspond to slots $$t_{y\left(N_{co,tv,1}^{SL} \cdot M_1 + k_2 \cdot M_2\right)}^{SL,in}, t_{y\left(N_{co,tv,1}^{SL} \cdot M_1 + k_2 \cdot M_2 + 1\right)}^{SL,in}, \ldots, t_{y\left(N_{co,tv,1}^{SL} \cdot M_1 + k_2 \cdot M_2 + M_2 - 1\right)}^{SL,in}$$

in the slot set $$T_{in}^{SL},$$

or respectively correspond to slots $$t_{y\left(N_{co,tv,1,max}^{SL} \cdot M_1 + k_2 \cdot M_2\right)}^{SL,in}, t_{y\left(N_{co,tv,1,max}^{SL} \cdot M_1 + k_2 \cdot M_2 + 1\right)}^{SL,in},$$
$$\ldots, t_{y\left(N_{co,tv,1,max}^{SL} \cdot M_1 + k_2 \cdot M_2 + M_2 - 1\right)}^{SL,in}$$

in the slot set $$T_{in}^{SL},$$

wherein the seventh joint resource condition may be absent (or, the seventh joint resource condition is always satisfied), or the seventh joint resource condition may include one or more of the following (in any combination of "and" or "or" where applicable):

$$N_{in}^{SL} \ge N_{co,tv,1,max}^{SL} \cdot M_1.$$

$$N_{in}^{SL} > N_{co,tv,1,max}^{SL} \cdot M_1.$$

$$N_{in}^{SL} = N_{co,tv,1,max}^{SL} \cdot M_1 + 1.$$

$$\left\lfloor \frac{N_{in}^{SL}}{M_1} \right\rfloor \ge N_{co,tv,1,max}^{SL}.$$

$$\left\lfloor \frac{N_{in}^{SL}}{M_1} \right\rfloor > N_{co,tv,1,max}^{SL}.$$

$$\left\lfloor \frac{N_{in}^{SL}}{M_1} \right\rfloor = N_{co,tv,1,max}^{SL} + 1.$$

-continued $$N_{in}^{SL} \le N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \ge N_{co,tv,1}^{SL} \cdot M_1.$$

$$N_{in}^{SL} > N_{co,tv,1}^{SL} \cdot M_1.$$

$$N_{in}^{SL} = N_{co,tv,1}^{SL} \cdot M_1 + 1.$$

$$\left\lfloor \frac{N_{in}^{SL}}{M_1} \right\rfloor \ge N_{co,tv,1}^{SL}.$$

$$\left\lfloor \frac{N_{in}^{SL}}{M_1} \right\rfloor > N_{co,tv,1}^{SL}.$$

$$\left\lfloor \frac{N_{in}^{SL}}{M_1} \right\rfloor = N_{co,tv,1}^{SL} + 1.$$

$$N_{in}^{SL} \le N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \ge 0.$$

$$\left( N_{in}^{SL} - N_{co,tv,1,max}^{SL} \cdot M_1 \right) - \left\lfloor \frac{\left( N_{in}^{SL} - N_{co,tv,1,max}^{SL} \cdot M_1 \right)}{M_2} \right\rfloor \cdot M_2 \ne 0.$$

$$\left( N_{in}^{SL} - N_{co,tv,1,max}^{SL} \cdot M_1 \right) - \left\lfloor \frac{\left( N_{in}^{SL} - N_{co,tv,1,max}^{SL} \cdot M_1 \right)}{M_2} \right\rfloor \cdot M_2 > 0.$$

$$\left( N_{in}^{SL} - N_{co,tv,1,max}^{SL} \cdot M_1 \right) - \left\lfloor \frac{\left( N_{in}^{SL} - N_{co,tv,1,max}^{SL} \cdot M_1 \right)}{M_2} \right\rfloor \cdot M_2 = 1.$$

(For example, when $M_2 = 2$.)

$$\left( N_{in}^{SL} - N_{co,tv,1,max}^{SL} \cdot M_1 \right) \bmod M_2 \ne 0.$$

$$\left( N_{in}^{SL} - N_{co,tv,1,max}^{SL} \cdot M_1 \right) \bmod M_2 > 0.$$

$$\left( N_{in}^{SL} - N_{co,tv,1,max}^{SL} \cdot M_1 \right) \bmod M_2 = 1. \ (\text{For example, when } M_2 = 2.)$$

$$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 \ne 0.$$

$$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 > 0.$$

$$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 = 1.$$

(For example, when $M_2 = 2$.)

$$\left( N_{in}^{SL} - N_{co,tv,1}^{SL} \cdot M_1 \right) \bmod M_2 \ne 0.$$

$$\left( N_{in}^{SL} - N_{co,tv,1}^{SL} \cdot M_1 \right) \bmod M_2 > 0.$$

$$\left( N_{in}^{SL} - N_{co,tv,1}^{SL} \cdot M_1 \right) \bmod M_2 = 1. \ (\text{For example, when } M_2 = 2.)$$

$$\left( N_{in}^{SL} - N_{co,tv,1,max}^{SL} \cdot M_1 \right) - \left\lfloor \frac{\left( N_{in}^{SL} - N_{co,tv,1,max}^{SL} \cdot M_1 \right)}{M_2} \right\rfloor \cdot M_2 = 0.$$

$$\left( N_{in}^{SL} - N_{co,tv,1,max}^{SL} \cdot M_1 \right) \bmod M_2 = 0.$$

$$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 = 0.$$

$$\left( N_{in}^{SL} - N_{co,tv,1}^{SL} \cdot M_1 \right) \bmod M_2 = 0.$$

Optionally, if an eighth joint resource condition is satisfied, then for $$k_2 = \left\lfloor \left(N_{in}^{SL} - N_{co,tv,1}^{SL} \cdot M_1\right)/M_2 \right\rfloor \text{(or for } k_2 = \left\lfloor \left(N_{in}^{SL} - N_{co,tv,1,max}^{SL} \cdot M_1\right)/M_2 \right\rfloor),$$

$$tv_{k_2}^{SL,co,2} \text{ indicates } \left(N_{in}^{SL} - N_{co,tv,1}^{SL} \cdot M_1\right) - \left\lfloor \left(N_{in}^{SL} - N_{co,tv,1}^{SL} \cdot M_1\right)/M_2 \right\rfloor \cdot M_2 \text{ slots}$$

$$\left( t_{k_2,0}^{SL,co,tv,2}, t_{k_2,1}^{SL,co,tv,2}, \dots, t_{k_2,\left(N_{in}^{SL}-N_{co,tv,1}^{SL}\cdot M_1\right)-\left\lfloor\left(N_{in}^{SL}-N_{co,tv,1}^{SL}\cdot M_1\right)/M_2\right\rfloor\cdot M_2 - 1}^{SL,co,tv,2} \right),$$

or indicates $\left(N_{in}^{SL} - N_{co,tv,1,max}^{SL} \cdot M_1\right) -$ $$\left\lfloor \left(N_{in}^{SL} - N_{co,tv,1,max}^{SL} \cdot M_1\right)/M_2 \right\rfloor \cdot M_2 \text{ slots } \left( t_{k_2,0}^{SL,co,tv,2}, t_{k_2,1}^{SL,co,tv,2}, \dots, \right.$$

$$\left. t_{k_2,\left(N_{in}^{SL}-N_{co,tv,1,max}^{SL}\cdot M_1\right)-\left\lfloor\left(N_{in}^{SL}-N_{co,tv,1,max}^{SL}\cdot M_1\right)/M_2\right\rfloor\cdot M_2 - 1}^{SL,co,tv,2} \right). \text{ Optionally,}$$

the $\left(N_{in}^{SL} - N_{co,tv,1}^{SL} \cdot M_1\right) - \left\lfloor \left(N_{in}^{SL} - N_{co,tv,1}^{SL} \cdot M_1\right)/M_2 \right\rfloor \cdot M_2$ slots $$\left( t_{k_2,0}^{SL,co,tv,2}, t_{k_2,1}^{SL,co,tv,2}, \dots, t_{k_2,\left(N_{in}^{SL}-N_{co,tv,1}^{SL}\cdot M_1\right)-\left\lfloor\left(N_{in}^{SL}-N_{co,tv,1}^{SL}\cdot M_1\right)/M_2\right\rfloor\cdot M_2 - 1}^{SL,co,tv,2} \right)$$

or the $\left(N_{in}^{SL} - N_{co,tv,1,max}^{SL} \cdot M_1\right) -$ $$\left\lfloor \left(N_{in}^{SL} - N_{co,iv,1,max}^{SL} \cdot M_1\right)/M_2 \right\rfloor \cdot M_2 \text{ slots } \left( t_{k_2,0}^{SL,co,tv,2}, t_{k_2,1}^{SL,co,tv,2}, \right.$$

$$\left. \dots, t_{k_2,\left(N_{in}^{SL}-N_{co,tv,1,max}^{SL}\cdot M_1\right)-\left\lfloor\left(N_{in}^{SL}-N_{co,tv,1,max}^{SL}\cdot M_1\right)/M_2\right\rfloor\cdot M_2 - 1}^{SL,co,tv,2} \right)$$

respectively correspond to slots $$t_{y\left(N_{co,tv,1}^{SL}\cdot M_1+\left\lfloor\left(N_{in}^{SL}-N_{co,tv1}^{SL}\cdot M_1\right)/M_2\right\rfloor\cdot M_2\right)}^{SL,in},$$

$$t_{y\left(N_{co,tv,1}^{SL}\cdot M_1+\left\lfloor\left(N_{in}^{SL}-N_{co,tv1}^{SL}\cdot M_1\right)/M_2\right\rfloor\cdot M_2+1\right)}^{SL,in}, \dots, t_{y\left(N_{in}^{SL}-1\right)}^{SL,in}$$

in the slot set $$T_{in}^{SL},$$

wherein the eighth joint resource condition may be absent (or, the eighth joint resource condition is always satisfied), or the eighth joint resource condition may include one or more of the following (in any combination of "and" or "or" where applicable):

$$N_{in}^{SL} \geq N_{co,tv,1,max}^{SL} \cdot M_1.$$

$$N_{in}^{SL} > N_{co,tv,1,max}^{SL} \cdot M_1.$$

$$N_{in}^{SL} = N_{co,tv,1,max}^{SL} \cdot M_1 + 1.$$

$$\left\lfloor \frac{N_{in}^{SL}}{M_1} \right\rfloor \geq N_{co,tv,1,max}^{SL}.$$

$$\left\lfloor \frac{N_{in}^{SL}}{M_1} \right\rfloor > N_{co,tv,1,max}^{SL}.$$

$$\left\lfloor \frac{N_{in}^{SL}}{M_1} \right\rfloor = N_{co,tv,1,max}^{SL} + 1.$$

$$N_{in}^{SL} \leq N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

-continued $$N_{in}^{SL} \geq N_{co,tv,1}^{SL} \cdot M_1.$$

$$N_{in}^{SL} > N_{co,tv,1}^{SL} \cdot M_1.$$

$$N_{in}^{SL} = N_{co,tv,1}^{SL} \cdot M_1 + 1.$$

$$\left\lfloor \frac{N_{in}^{SL}}{M_1} \right\rfloor \geq N_{co,tv,1}^{SL}.$$

$$\left\lfloor \frac{N_{in}^{SL}}{M_1} \right\rfloor > N_{co,tv,1}^{SL}.$$

$$\left\lfloor \frac{N_{in}^{SL}}{M_1} \right\rfloor = N_{co,tv,1}^{SL} + 1.$$

$$N_{in}^{SL} \leq N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \geq 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 \neq 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 > 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 = 1.$$

(For example, when $M_2 = 2$.)

$$\left(N_{in}^{SL} - N_{co,tv,1,max}^{SL} \cdot M_1\right) \bmod M_2 \neq 0.$$

$$\left(N_{in}^{SL} - N_{co,tv,1,max}^{SL} \cdot M_1\right) \bmod M_2 > 0.$$

$$\left(N_{in}^{SL} - N_{co,tv,1,max}^{SL} \cdot M_1\right) \bmod M_2 = 1. \text{ (For example, when } M_2 = 2.)$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 \neq 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 > 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 = 1.$$

(For example, when $M_2 = 2$.)

$$\left(N_{in}^{SL} - N_{co,tv,1}^{SL} \cdot M_1\right) \bmod M_2 \neq 0.$$

$$\left(N_{in}^{SL} - N_{co,tv,1}^{SL} \cdot M_1\right) \bmod M_2 > 0.$$

$$\left(N_{in}^{SL} - N_{co,tv,1}^{SL} \cdot M_1\right) \bmod M_2 = 1. \text{ (For example, when } M_2 = 2.)$$

Optionally, if a ninth joint resource condition is satisfied, then for $$k_2 = \left\lfloor \left(N_{in}^{SL} - N_{co,tv,1}^{SL} \cdot M_1\right)/M_2 \right\rfloor \text{(or for } k_2 = \left\lfloor \left(N_{in}^{SL} - N_{co,tv,1,max}^{SL} \cdot M_1\right)/M_2 \right\rfloor),$$

$$tv_{k_2}^{SL,co,2} \text{ indicates } \left(N_{in}^{SL} - N_{co,tv,1}^{SL} \cdot M_1\right) \bmod M_2$$

$$\text{slots } \left( t_{k_2,0}^{SL,co,tv,2}, t_{k_2,1}^{SL,co,tv,2}, \dots, t_{k_2,\left(\left(N_{in}^{SL}-N_{co,tv,1}^{SL}\cdot M_1\right)\bmod M_2\right)-1}^{SL,co,tv,2} \right),$$

or indicates $\left(N_{in}^{SL} - N_{co,tv,1,max}^{SL} \cdot M_1\right) \bmod M_2$ slots $$\left( t_{k_2,0}^{SL,co,tv,2}, t_{k_2,1}^{SL,co,tv,2}, \dots, t_{k_2,\left(\left(N_{in}^{SL}-N_{co,tv,1,max}^{SL}\cdot M_1\right)\bmod M_2\right)-1}^{SL,co,tv,2} \right). \text{ Optionally,}$$

the $\left(N_{in}^{SL} - N_{co,tv,1}^{SL} \cdot M_1\right) \bmod M_2$ slots $$\left( t_{k_2,0}^{SL,co,tv,2}, t_{k_2,1}^{SL,co,tv,2}, \dots, t_{k_2,\left(\left(N_{in}^{SL}-N_{co,tv,1}^{SL}\cdot M_1\right)\bmod M_2\right)-1}^{SL,co,tv,2} \right)$$

-continued or the $\left(N_{in}^{SL} - N_{co,tv,1,max}^{SL} \cdot M_1\right) \bmod M_2$ slots $$\left(t_{k_2,0}^{SL,co,tv,2}, t_{k_2,1}^{SL,co,tv,2}, \ldots, t_{k_2,\left(\left(N_{in}^{SL}-N_{co,tv,1,max}^{SL}\cdot M_1\right)\bmod M_2\right)-1}^{SL,co,tv,2}\right)$$

respectively correspond to slots $$t_{y\left(N_{co,tv,1}^{SL}\cdot M_1+\lfloor\left(N_{in}^{SL}-N_{co,tv,1}^{SL}M_1\right)/M_2\rfloor\cdot M_2\right)}^{SL,in},$$

$$t_{y\left(N_{co,tv,1}^{SL}\cdot M_1+\lfloor\left(N_{in}^{SL}-N_{co,tv,1}^{SL}M_1\right)/M_2\rfloor\cdot M_2+1\right)}^{SL,in}, \ldots, t_{y\left(N_{in}^{SL}-1\right)}^{SL,in}$$

in the slot set $$T_{in}^{SL},$$

or respectively correspond to slots $$t_{y\left(N_{co,tv,1,max}^{SL}\cdot M_1+\lfloor\left(N_{in}^{SL}-N_{co,tv,1,max}^{SL}M_1\right)/M_2\rfloor\cdot M_2\right)}^{SL,in},$$

$$t_{y\left(N_{co,tv,1,max}^{SL}\cdot M_1+\lfloor\left(N_{in}^{SL}-N_{co,tv,1,max}^{SL}M_1\right)/M_2\rfloor\cdot M_2+1\right)}^{SL,in}, \ldots, t_{y\left(N_{in}^{SL}-1\right)}^{SL,in}$$

in the slot set $$T_{in}^{SL},$$

wherein the ninth joint resource condition may be absent (or, the ninth joint resource condition is always satisfied), or the ninth joint resource condition may include one or more of the following (in any combination of "and" or "or" where applicable):

$$N_{in}^{SL} \geq N_{co,tv,1,max}^{SL} \cdot M_1.$$

$$N_{in}^{SL} > N_{co,tv,1,max}^{SL} \cdot M_1.$$

$$N_{in}^{SL} = N_{co,tv,1,max}^{SL} \cdot M_1 + 1.$$

$$\left\lfloor \frac{N_{in}^{SL}}{M_1} \right\rfloor \geq N_{co,tv,1,max}^{SL}.$$

$$\left\lfloor \frac{N_{in}^{SL}}{M_1} \right\rfloor > N_{co,tv,1,max}^{SL}.$$

$$\left\lfloor \frac{N_{in}^{SL}}{M_1} \right\rfloor = N_{co,tv,1,max}^{SL} + 1.$$

$$N_{in}^{SL} \leq N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \geq N_{co,tv,1}^{SL} \cdot M_1.$$

$$N_{in}^{SL} > N_{co,tv,1}^{SL} \cdot M_1.$$

$$N_{in}^{SL} = N_{co,tv,1}^{SL} \cdot M_1 + 1.$$

$$\left\lfloor \frac{N_{in}^{SL}}{M_1} \right\rfloor \geq N_{co,tv,1}^{SL}.$$

$$\left\lfloor \frac{N_{in}^{SL}}{M_1} \right\rfloor > N_{co,tv,1}^{SL}.$$

-continued $$\left\lfloor \frac{N_{in}^{SL}}{M_1} \right\rfloor = N_{co,tv,1}^{SL} + 1.$$

$$N_{in}^{SL} \leq N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \geq 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 \neq 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 > 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 = 1.$$

(For example, when $M_2 = 2$.)

$$\left(N_{in}^{SL} - N_{co,tv,1,max}^{SL} \cdot M_1\right) \bmod M_2 \neq 0.$$

$$\left(N_{in}^{SL} - N_{co,tv,1,max}^{SL} \cdot M_1\right) \bmod M_2 > 0.$$

$$\left(N_{in}^{SL} - N_{co,tv,1,max}^{SL} \cdot M_1\right) \bmod M_2 = 1. \text{ (For example, when } M_2 = 2.)$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 \neq 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 > 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 = 1.$$

(For example, when $M_2 = 2$.)

$$\left(N_{in}^{SL} - N_{co,tv,1}^{SL} \cdot M_1\right) \bmod M_2 \neq 0.$$

$$\left(N_{in}^{SL} - N_{co,tv,1}^{SL} \cdot M_1\right) \bmod M_2 > 0.$$

$$\left(N_{in}^{SL} - N_{co,tv,1}^{SL} \cdot M_1\right) \bmod M_2 = 1. \text{ (For example, when } M_2 = 2.)$$

Optionally, if a tenth joint resource condition is satisfied, then for $$k_2 = \left\lfloor \left(N_{in}^{SL} - N_{co,tv,1}^{SL} \cdot M_1\right)/M_2 \right\rfloor \text{ (or for } k_2 = \left\lfloor \left(N_{in}^{SL} - N_{co,tv,1,max}^{SL} \cdot M_1\right)/M_2 \right\rfloor\text{)},$$

$$tv_{k_2}^{SL,co,2}$$

does not indicate any resource-corresponding slot. The tenth joint resource condition may be absent (or, the tenth joint resource condition is always satisfied), or the tenth joint resource condition may include one or more of the following (in any combination of "and" or "or" where applicable):

$$N_{in}^{SL} \geq N_{co,tv,1,max}^{SL} \cdot M_1.$$

$$N_{in}^{SL} > N_{co,tv,1,max}^{SL} \cdot M_1.$$

$$N_{in}^{SL} = N_{co,tv,1,max}^{SL} \cdot M_1 + 1.$$

$$\left\lfloor \frac{N_{in}^{SL}}{M_1} \right\rfloor \geq N_{co,tv,1,max}^{SL}.$$

$$\left\lfloor \frac{N_{in}^{SL}}{M_1} \right\rfloor > N_{co,tv,1,max}^{SL}.$$

-continued $$\left\lfloor \frac{N_{in}^{SL}}{M_1} \right\rfloor = N_{co,tv,1,max}^{SL} + 1.$$

$$N_{in}^{SL} \leq N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \geq N_{co,tv,1}^{SL} \cdot M_1.$$

$$N_{in}^{SL} > N_{co,tv,1}^{SL} \cdot M_1.$$

$$N_{in}^{SL} = N_{co,tv,1}^{SL} \cdot M_1 + 1.$$

$$\left\lfloor \frac{N_{in}^{SL}}{M_1} \right\rfloor \geq N_{co,tv,1}^{SL}.$$

$$\left\lfloor \frac{N_{in}^{SL}}{M_1} \right\rfloor > N_{co,tv,1}^{SL}.$$

$$\left\lfloor \frac{N_{in}^{SL}}{M_1} \right\rfloor = N_{co,tv,1}^{SL} + 1.$$

$$N_{in}^{SL} \leq N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \geq 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 \neq 0.$$

$$\left(N_{in}^{SL} - N_{co,tv,1,max}^{SL} \cdot M_1\right) \bmod M_2 = 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 = 0.$$

$$\left(N_{in}^{SL} - N_{co,tv,1}^{SL} \cdot M_1\right) \bmod M_2 = 0.$$

Optionally, if an eleventh joint resource condition is satisfied, then for the integer satisfying $$\left\lfloor \left(N_{in}^{SL} - N_{co,tv,1}^{SL} \cdot M_1\right)/M_2 \right\rfloor < k_2 < N_{co,tv,2}^{SL}$$

(or satisfying $$\left\lfloor \left(N_{in}^{SL} - N_{co,tv,1}^{SL} \cdot M_1\right)/M_2 \right\rfloor < k_2 < N_{co,tv,2,max}^{SL}\right), tv_{k_2}^{SL,co,2}$$

does not indicate any resource-corresponding slot. The eleventh joint resource condition may be absent (or, the eleventh joint resource condition is always satisfied), or the eleventh joint resource condition may include one or more of the following (in any combination of "and" or "or" where applicable):

$$N_{in}^{SL} \geq N_{co,tv,1,max}^{SL} \cdot M_1.$$

$$N_{in}^{SL} > N_{co,tv,1,max}^{SL} \cdot M_1.$$

$$N_{in}^{SL} = N_{co,tv,1,max}^{SL} \cdot M_1 + 1.$$

$$\left\lfloor \frac{N_{in}^{SL}}{M_1} \right\rfloor \geq N_{co,tv,1,max}^{SL}.$$

-continued $$\left\lfloor \frac{N_{in}^{SL}}{M_1} \right\rfloor > N_{co,tv,1,max}^{SL}.$$

$$\left\lfloor \frac{N_{in}^{SL}}{M_1} \right\rfloor = N_{co,tv,1,max}^{SL} + 1.$$

$$N_{in}^{SL} \leq N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \geq N_{co,tv,1}^{SL} \cdot M_1.$$

$$N_{in}^{SL} > N_{co,tv,1}^{SL} \cdot M_1.$$

$$N_{in}^{SL} = N_{co,tv,1}^{SL} \cdot M_1 + 1.$$

$$\left\lfloor \frac{N_{in}^{SL}}{M_1} \right\rfloor \geq N_{co,tv,1}^{SL}.$$

$$\left\lfloor \frac{N_{in}^{SL}}{M_1} \right\rfloor > N_{co,tv,1}^{SL}.$$

$$\left\lfloor \frac{N_{in}^{SL}}{M_1} \right\rfloor = N_{co,tv,1}^{SL} + 1.$$

$$N_{in}^{SL} \leq N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \geq 0.$$

$$\left\lfloor \left(N_{in}^{SL} - N_{co,tv,1,max}^{SL} \cdot M_1\right)/M_2 \right\rfloor < N_{co,tv,2,max}^{SL} - 1.$$

$$\left\lfloor \left(N_{in}^{SL} - N_{co,tv,1,max}^{SL} \cdot M_1\right)/M_2 \right\rfloor \leq N_{co,tv,2,max}^{SL} - 2.$$

$$\left\lfloor \left(N_{in}^{SL} - N_{co,tv,1}^{SL} \cdot M_1\right)/M_2 \right\rfloor < N_{co,tv,2}^{SL} - 1.$$

$$\left\lfloor \left(N_{in}^{SL} - N_{co,tv,1}^{SL} \cdot M_1\right)/M_2 \right\rfloor \leq N_{co,tv,2}^{SL} - 2.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 \neq 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 > 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 = 1.$$

(For example, when $M_2 = 2$.)

$$\left(N_{in}^{SL} - N_{co,tv,1,max}^{SL} \cdot M_1\right) \bmod M_2 \neq 0.$$

$$\left(N_{in}^{SL} - N_{co,tv,1,max}^{SL} \cdot M_1\right) \bmod M_2 > 0.$$

$$\left(N_{in}^{SL} - N_{co,tv,1,max}^{SL} \cdot M_1\right) \bmod M_2 = 1. \text{ (For example, when } M_2 = 2.)$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 \neq 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 > 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 = 1.$$

(For example, when $M_2 = 2$.)

$$\left(N_{in}^{SL} - N_{co,tv,1}^{SL} \cdot M_1\right) \bmod M_2 \neq 0.$$

$$\left(N_{in}^{SL} - N_{co,tv,1}^{SL} \cdot M_1\right) \bmod M_2 > 0.$$

$$\left(N_{in}^{SL} - N_{co,tv,1}^{SL} \cdot M_1\right) \bmod M_2 = 1. \text{ (For example, when } M_2 = 2.)$$

-continued $$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 = 0.$$

$$\left(N_{in}^{SL} - N_{co,tv,1,max}^{SL} \cdot M_1\right) \bmod M_2 = 0.$$

$$\left(N_{in}^{SL} - N_{co,tv,1}^{SL} \cdot M_1\right) - \left\lfloor \frac{\left(N_{in}^{SL} - N_{co,tv,1}^{SL} \cdot M_1\right)}{M_2} \right\rfloor \cdot M_2 = 0.$$

$$\left(N_{in}^{SL} - N_{co,tv,1}^{SL} \cdot M_1\right) \bmod M_2 = 0.$$

Optionally, if the seventh joint resource condition and/or the eighth joint resource condition and/or the ninth joint resource condition and/or the tenth joint resource condition and/or the eleventh joint resource condition is satisfied, then for the integer $k_1$ satisfying $$0 \le k_1 < N_{co,tv,1}^{SL} \left(\text{or satisfying } 0 \le k_1 < N_{co,tv,1,max}^{SL}\right), tv_{k_1}^{SL,co,1}$$

indicates $M_1$ slots $$\left(t_{k_1,0}^{SL,co,tv,1}, t_{k_1,1}^{SL,co,tv,1}, \dots, t_{k_1,M_1-1}^{SL,co,tv,1}\right).$$

Optionally, the $M_1$ slot $$\left(t_{k_1,0}^{SL,co,tv,1}, t_{k_1,1}^{SL,co,tv,1}, \dots, t_{k_1,M_1-1}^{SL,co,tv,1}\right)$$

respectively correspond to slots a slots $$t_{y(k_1,M_1)}^{SL,in}, t_{y(k_1,M_1+1)}^{SL,in}, \dots, t_{y(k_1,M_1+M_1-1)}^{SL,in} \text{ in the slot set } T_{in}^{SL}.$$

Optionally, if a twelfth joint resource condition is satisfied, then for the integer $k_1$ satisfying $$0 \le k_1 < N_{co,tv,1}^{SL} \left(\text{or satisfying } 0 \le k_1 < N_{co,tv,1,max}^{SL}\right), tv_{k_1}^{SL,co,1}$$

indicates $M_1$ slots $$\left(t_{k_1,0}^{SL,co,tv,1}, t_{k_1,1}^{SL,co,tv,1}, \dots, t_{k_1,M_1-1}^{SL,co,tv,1}\right).$$

Optionally, the $M_1$ slots $$\left(t_{k_1,0}^{SL,co,tv,1}, t_{k_1,1}^{SL,co,tv,1}, \dots, t_{k_1,M_1-1}^{SL,co,tv,1}\right)$$

respectively correspond to slots a slots $$t_{y(k_1,M_1)}^{SL,in}, t_{y(k_1,M_1+1)}^{SL,in}, \dots, t_{y(k_1,M_1+M_1-1)}^{SL,in} \text{ in the slot set } T_{in}^{SL},$$

wherein the twelfth joint resource condition may be absent (or, the twelfth joint resource condition is always satisfied), or the twelfth joint resource condition may include one or more of the following (in any combination of "and" or "or" where applicable):

$$N_{in}^{SL} \le N_{co,tv,1,max}^{SL} \cdot M_1.$$

$$N_{in}^{SL} < N_{co,tv,1,max}^{SL} \cdot M_1.$$

$$N_{in}^{SL} = N_{co,tv,1,max}^{SL} \cdot M_1.$$

$$\left\lfloor \frac{N_{in}^{SL}}{M_1} \right\rfloor \le N_{co,tv,1,max}^{SL}.$$

$$\left\lfloor \frac{N_{in}^{SL}}{M_1} \right\rfloor < N_{co,tv,1,max}^{SL}.$$

$$\left\lfloor \frac{N_{in}^{SL}}{M_1} \right\rfloor = N_{co,tv,1,max}^{SL}.$$

$$\frac{N_{in}^{SL}}{M_1} \le N_{co,tv,1,max}^{SL}.$$

$$\frac{N_{in}^{SL}}{M_1} < N_{co,tv,1,max}^{SL}.$$

$$\frac{N_{in}^{SL}}{M_1} = N_{co,tv,1,max}^{SL}.$$

$$N_{in}^{SL} \le N_{co,tv,1,max}^{SL} \cdot M_1 + N_{co,tv,2,max}^{SL} \cdot M_2.$$

$$N_{in}^{SL} < N_{co,tv,1,max}^{SL} \cdot M_1 + N_{co,tv,2,max}^{SL} \cdot M_2.$$

$$N_{in}^{SL} = N_{co,tv,1,max}^{SL} \cdot M_1 + N_{co,tv,2,max}^{SL} \cdot M_2.$$

$$N_{in}^{SL} \le N_{co,tv,1}^{SL} \cdot M_1.$$

$$N_{in}^{SL} < N_{co,tv,1}^{SL} \cdot M_1.$$

$$N_{in}^{SL} = N_{co,tv,1}^{SL} \cdot M_1.$$

$$\left\lfloor \frac{N_{in}^{SL}}{M_1} \right\rfloor \le N_{co,tv,1}^{SL}.$$

$$\left\lfloor \frac{N_{in}^{SL}}{M_1} \right\rfloor < N_{co,tv,1}^{SL}.$$

$$\left\lfloor \frac{N_{in}^{SL}}{M_1} \right\rfloor = N_{co,tv,1}^{SL}.$$

$$\frac{N_{in}^{SL}}{M_1} \le N_{co,tv,1}^{SL}.$$

$$\frac{N_{in}^{SL}}{M_1} < N_{co,tv,1}^{SL}.$$

$$\frac{N_{in}^{SL}}{M_1} = N_{co,tv,1}^{SL}.$$

$$N_{in}^{SL} \le N_{co,tv,1}^{SL} \cdot M_1 + N_{co,tv,2}^{SL} \cdot M_2.$$

$$N_{in}^{SL} < N_{co,tv,1}^{SL} \cdot M_1 + N_{co,tv,2}^{SL} \cdot M_2.$$

$$N_{in}^{SL} = N_{co,tv,1}^{SL} \cdot M_1 + N_{co,tv,2}^{SL} \cdot M_2.$$

$$N_{in}^{SL} > 0.$$

$$N_{in}^{SL} \ge 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 \ne 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 > 0.$$

$$\left(N_{in}^{SL} - N_{co,tv,1,max}^{SL} \cdot M_1\right) - \left\lfloor \frac{\left(N_{in}^{SL} - N_{co,tv,1,max}^{SL} \cdot M_1\right)}{M_2} \right\rfloor \cdot M_2 = 1.$$

(For example, when $M_2 = 2$.)

$$\left(N_{in}^{SL} - N_{co,tv,1,max}^{SL} \cdot M_1\right) \bmod M_2 \ne 0.$$

$$\left(N_{in}^{SL} - N_{co,tv,1,max}^{SL} \cdot M_1\right) \bmod M_2 > 0.$$

$$\left(N_{in}^{SL} - N_{co,tv,1,max}^{SL} \cdot M_1\right) \bmod M_2 = 1. \text{ (For example, when } M_2 = 2.)$$

-continued $$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 \neq 0.$$

$$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 > 0.$$

$$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 = 1.$$

(For example, when $M_2 = 2$.)

$$\left( N_{in}^{SL} - N_{co,tv,1}^{SL} \cdot M_1 \right) \mathrm{mod} M_2 \neq 0.$$

$$\left( N_{in}^{SL} - N_{co,tv,1}^{SL} \cdot M_1 \right) \mathrm{mod} M_2 > 0.$$

$$\left( N_{in}^{SL} - N_{co,tv,1}^{SL} \cdot M_1 \right) \mathrm{mod} M_2 = 1. \quad \text{(For example, when } M_2 = 2.)$$

$$\left( N_{in}^{SL} - N_{co,tv,1,max}^{SL} \cdot M_1 \right) - \left\lfloor \frac{\left( N_{in}^{SL} - N_{co,tv,1,max}^{SL} \cdot M_1 \right)}{M_2} \right\rfloor \cdot M_2 = 0.$$

$$\left( N_{in}^{SL} - N_{co,tv,1,max}^{SL} \cdot M_1 \right) \mathrm{mod} M_2 = 0.$$

$$\left( N_{in}^{SL} - N_{co,tv,1}^{SL} \cdot M_1 \right) - \left\lfloor \frac{\left( N_{in}^{SL} - N_{co,tv,1}^{SL} \cdot M_1 \right)}{M_2} \right\rfloor \cdot M_2 = 0.$$

$$\left( N_{in}^{SL} - N_{co,tv,1}^{SL} \cdot M_1 \right) \mathrm{mod} M_2 = 0.$$

Optionally, each of one or more slots indicated by a TRIV may be represented as an offset with respect to a reference slot. For example, each of one or more slots (for example, slots $$t_{k_1,0}^{SL,co,tv,1}, t_{k_1,1}^{SL,co,tv,1}, \dots, t_{k_1,M_1-1}^{SL,co,tv,1}$$

indicated by a type-1 TRIV (for example, $$t_{k_1}^{SL,co,1}, \text{where } 0 \leq k_1 < N_{co,tv,1}^{SL})$$

may be represented as an offset with respect to the same reference slot (for example, denoted as $$t_{k_1,ref}^{SL,co,tv,1}).$$

For example, each of one or more slots (for example, slots $$t_{k_2,0}^{SL,co,tv,2}, t_{k_2,1}^{SL,co,tv,2}, \dots, t_{k_2,M_2-1}^{SL,co,tv,2}$$

indicated by a type-2 TRIV (for example, $$tv_{k_2}^{SL,co,2}, \text{where } 0 \leq k_2 < N_{co,tv,2}^{SL})$$

may be represented as an offset with respect to the same reference slot (for example, denoted as $$t_{k_2,ref}^{SL,co,tv,2}).$$

wherein
  Optionally, the offset may be an offset between indexes corresponding to two elements in the same slot set (for example, the reference slot set). For example, if the index of the reference slot $$t_{k_1,ref}^{SL,co,tv,1}$$

in the reference slot set is 8, and the offset of the slot $$t_{k_1,1}^{SL,co,tv,1}$$

with respect to the reference slot $$t_{k_1,ref}^{SL,co,tv,1}$$

is 2, then the index of the slot $$t_{k_1,1}^{SL,co,tv,1}$$

in the reference slot set is 10.
Optionally, the value of the offset is a value in a set $$O_{ref}^{SL,co,tv} = \{0, 1, \dots, W_{ref}^{SL,co,tv} - 1\}$$

(or a subset of the set $$O_{ref}^{SL,co,tv}).$$

Optionally, $$W_{ref}^{SL,co,tv}$$

is a predefined or configured or pre-configure value, or is determined by another predefined or configured or pre-configure value, or is determined according to an indication (or a request) of another UE. For example, $$W_{ref}^{SL,co,tv} = 32.$$

As another example, $$W_{ref}^{SL,co,tv} = 64.$$

Optionally, the value of $$W_{ref}^{SL,co,tv}$$

corresponding to the type-1 TRIV may be different from the value of $$W_{ref}^{SL,co,tv}$$

corresponding to the type-2 TRIV.

Optionally, for one or more (for example, all) $k_1$ is satisfying $$0 \le k_1 < N_{co,tv,1}^{SL},$$

the reference slot $$t_{k_1,ref}^{SL,co,tv,1}$$

is the same slot. For example, $$t_{0,ref}^{SL,co,tv,1} = t_{1,ref}^{SL,co,tv,1} = \ldots = t_{N_{co,tv,1}^{SL}-1,ref}^{SL,co,tv,1}.$$

As another example, $$t_{1,ref}^{SL,co,tv,1} = \ldots = t_{N_{co,tv,1}^{SL}-1,ref}^{SL,co,tv,1}.$$

Optionally, for one or more (for example, all) $k_1$s satisfying $$1 \le k_1 < N_{co,tv,1}^{SL},$$

the reference slot $$t_{k_1,ref}^{SL,co,tv,1}$$

corresponding to $$tv_{k_1}^{SL,co,1}$$

is related to a slow indicated by $$tv_{k_1-1}^{SL,co,1}$$

(for example, the last slot indicated by $$tv_{k_1-1}^{SL,co,1}, \text{ for example, } t_{k_1-1,M_1-1}^{SL,co,tv,1}).$$

For example, the reference slot $$t_{k_1,ref}^{SL,co,tv,1}$$

is the next slot following the slot $$t_{k_1-1,M_1-1}^{SL,co,tv,1}$$

in the reference slot set, or the index of the reference slot $$t_{k_1,ref}^{SL,co,tv,1}$$

in the reference slot set is equal to the index of the slot $$t_{k_1-1,M_1-1}^{SL,co,tv,1}$$

in the reference slot set plus 1.

Optionally, the reference slot $$t_{k_1,ref}^{SL,co,tv,1}$$

corresponding to $$tv_{k_1}^{SL,co,1}\left(1 \le k_1 < N_{co,tv,1}^{SL}\right)$$

is related to the reference slot $$t_{k_1-1,ref}^{SL,co,tv,1}$$

corresponding to $$tv_{k_1-1}^{SL,co,1}.$$

For example, the index of $$t_{k_1,ref}^{SL,co,tv,1}$$

in the reference slot set is denoted as $$q_{(k_1)}^{SL,co,tv,1},$$

and the index of $$t_{k_1-1,ref}^{SL,co,tv,1}$$

in the reference slot set is denoted as $$q_{(k_1-1)}^{SL,co,tv,1},$$

so that $$q_{(k_1)}^{SL,co,tv,1} = q_{(k_1-1)}^{SL,co,tv,1} + Q_{ref}^{SL,co,tv,1}, \text{ wherein } Q_{ref}^{SL,co,tv,1}$$

may be a positive integer. Optionally, $$Q_{ref}^{SL,co,tv,1}$$

may be a predefined or configured or pre-configure value, or may be determined according to another predefined or configured or pre-configure value. For example, $$Q_{ref}^{SL,co,tv,1}$$

may be related to $M_1$ (for example, $$Q_{ref}^{SL,co,tv,1} = M_1;$$

as another example, $$Q_{ref}^{SL,co,tv,1} = M_1 - 1;$$

as another example, $$Q_{ref}^{SL,co,tv,1} = M_1 + 1).$$

Optionally, the reference slot $t_{0,ref}^{SL,co,tv,1}$ corresponding to $tv_0^{SL,co,1}$ may be indicated in the inter-UE coordination message. Optionally, the reference slot $t_{0,ref}^{SL,co,tv,1}$ corresponding to $tv_0^{SL,co,1}$ is related to a slot (for example, denoted as $$t_{msg}^{SL,co})$$

for transmitting the inter-UE coordination message. For example, $$t_{ref}^{SL,co,tv} = t_{msg}^{SL,co}.$$

Optionally, for one or more (for example, all) $k_2$s satisfying $$0 \le k_2 < N_{co,tv,2}^{SL},$$

the reference slot $$t_{k,ref}^{SL,co,tv,2}$$

is the same slot. For example, $$t_{0,ref}^{SL,co,tv,2} = t_{1,ref}^{SL,co,tv,2} = \ldots = t_{N_{co,tv,2}^{SL}-1,ref}^{SL,co,tv,2}.$$

As another example, $$t_{1,ref}^{SL,co,tv,2} = \ldots = t_{N_{co,tv,2}^{SL}-1,ref}^{SL,co,tv,2}.$$

Optionally, for one or more (for example, all) $k_2$s satisfying $$1 \le k_2 < N_{co,tv,2}^{SL},$$

the reference slot $t_{k_2,ref}^{SL,co,tv,2}$ corresponding to $tv_{k_2}^{SL,co,2}$ is related to a slot indicated by $$tv_{k_2-1}^{SL,co,2}$$

(for example, the last slot indicated by $$tv_{k_2-1}^{SL,co,2},$$

for example, $$t_{k_2-1,M_2-1}^{SL,co,tv,2}).$$

For example, the reference slot $$t_{k_2,ref}^{SL,co,tv,2}$$

is the next slot following the slot $$t_{k_2-1,M_2-1}^{SL,co,tv,2}$$

in the reference slot set, or the index of the reference slot $$t_{k_2,ref}^{SL,co,tv,2}$$

in the reference slot set is equal to the index of the slot $$t_{k_2-1,M_2-1}^{SL,co,tv,2}$$

in the reference slot set plus 1. Optionally, the reference slot $$t_{k_2,ref}^{SL,co,tv,2}$$

corresponding to $$tv_{k_2}^{SL,co,2}\left(1 \le k_2 < N_{co,tv,2}^{SL}\right)$$

is related to the reference slot $$t_{k_2-1,ref}^{SL,co,tv,2}$$

corresponding to $$t_{k_2-1}^{SL,co,2}.$$

For example, the index of $$t_{k_2,ref}^{SL,co,tv,2}$$

in the reference slot set is denoted as $$q_{(k_2)}^{SL,co,tv,2},$$

and the index of $$t_{k_2-1,ref}^{SL,co,tv,2}$$

in the reference slot set is denoted as $$q_{(k_2-1)}^{SL,co,tv,2},\text{ so that }q_{(k_2)}^{SL,co,tv,2} = q_{(k_2-1)}^{SL,co,tv,2} + Q_{ref}^{SL,co,tv,2},\text{ wherein }Q_{ref}^{SL,co,tv,2}$$

may be a positive integer. Optionally, $$Q_{ref}^{SL,co,tv,2}$$

may be a predefined or configured or pre-configure value, or may be determined according to another predefined or configured or pre-configure value. For example, $$Q_{ref}^{SL,co,tv,2}$$

may be related to $M_2$ (for example, $$Q_{ref}^{SL,co,tv,2} = M_2;$$

as another example, $$Q_{ref}^{SL,co,tv,2} = M_2 - 1;$$

as another example $$Q_{ref}^{SL,co,tv,2} = M_2 + 1\big).$$

Optionally, the reference slot $$t_{0,ref}^{SL,co,tv,2}\text{ corresponding to }tv_0^{SL,co,2}$$

is related to the reference slot $$t_{N_{co,tv,1}^{SL}-1,ref}^{SL,co,tv,1}\text{ corresponding to }tv_{N_{co,tv,1}^{SL}-1}^{SL,co,1}.$$

For example, the index of $$t_{0,ref}^{SL,co,tv,2}$$

in the reference slot set is denoted as $$q_{(0)}^{SL,co,tv,2},$$

and the index of $$t^{SL,co,tv,1}_{N^{SL}_{co,tv,1}-1,ref}$$

in the reference slot set is denoted as $$q^{SL,co,tv,1}_{\left(N^{SL}_{co,tv,1}-1\right)},$$

so that $$q^{SL,co,tv,2}_{(0)} = q^{SL,co,tv,1}_{\left(N^{SL}_{co,tv,1}-1\right)} + Q^{SL,co,tv,2}_{ref}, \text{ or } q^{SL,co,tv,2}_{(0)} = q^{SL,co,tv,1}_{\left(N^{SL}_{co,tv,1}-1\right)} + Q^{SL,co,tv,1}_{ref}.$$

Optionally, the reference slot $$t^{SL,co,tv,2}_{0,ref}$$

corresponding to $$tv^{SL,co,2}_0$$

is related to a slot indicated by $$tv^{SL,co,1}_{N^{SL}_{co,tv,1}-1}$$

(for example, the last slot indicated by $$tv^{SL,co,1}_{N^{SL}_{co,tv,1}-1},$$

for example, $$t^{SL,co,tv,1}_{N^{SL}_{co,tv,1}-1,M_1-1}\Big).$$

For example, the reference slot $$t^{SL,co,tv,2}_{0,ref}$$

is the next slot following the slot $$t^{SL,co,tv,1}_{N^{SL}_{co,tv,1}-1,M_1-1}$$

in the reference slot set, or the index of the reference slot $$t^{SL,co,tv,2}_{0,ref}$$

in the reference slot set is equal to the index of the slot $$t^{SL,co,tv,1}_{N^{SL}_{co,tv,1}-1,M_1-1}$$

in the reference slot set plus 1.

In addition, in step S103, the inter-UE coordination message is transmitted.

Optionally, the inter-UE coordination message is carried in physical layer signaling. For example, the content of the inter-UE coordination message may be indicated in a $1^{st}$-stage SCI format and/or a $2^{nd}$-stage SCI format, wherein the $1^{st}$-stage SCI format and/or the $2^{nd}$-stage SCI format may be carried by a PSCCH and/or a PSSCH.

Optionally, the inter-UE coordination message is carried in higher layer signaling. For example, the content of the inter-UE coordination message may be indicated in a MAC CE, or may be indicated in a PC5-RRC message. The MAC CE and/or the PC5-RRC message may be transmitted in a PSCCH and/or a PSSCH.

Optionally, transmission to another UE is performed in a unicast manner.

Optionally, transmission to one or more other UEs is performed in a groupcast manner.

Optionally, transmission to one or more other UEs is performed in a broadcast manner.

Optionally, in Embodiment 1 of the present invention, the notion that a TRIV "does not indicate any resource-corresponding slot" may also be expressed as that the TRIV and/or a corresponding FRIV does not correspond to any reserved or allocated or used resource.

Optionally, in Embodiment 1 of the present invention, a set may be an ordered set. For example, elements in the set may be numbered starting from 0 according to the arrangement order thereof (for example, the indexes of elements in a set having three elements may be respectively 0, 1, and 2). Optionally, the index of an element in a set may also be referred to as a "subscript" thereof where applicable (for example, when an element of a set is represented by a mathematical symbol having an integer subscript).

Optionally, in Embodiment 1 of the present invention, $$N^{SL}_{co,tv,1,max}$$

may be determined in one of the following manners:

Optionally, $N^{SL}_{co,tv,1,max}$ is a predefined or configured or pre−configured constant. For example, $N^{SL}_{co,tv,1,max} = 0$. As another example, $N^{SL}_{co,tv,1,max} = 1$. As another example, $N^{SL}_{co,tv,1,max} = 2$. As another example, $N^{SL}_{co,tv,1,max} = 3$. As another example, $N^{SL}_{co,tv,1,max} = 4$. As another example, $N^{SL}_{co,tv,1,max} = 5$. As another example, $N^{SL}_{co,tv,1,max} = 6$.

$N^{SL}_{co,tv,1,max} = N^{SL}_{in,max}/M_1$. For example, $M_1 = 2$, and correspondingly, $N^{SL}_{co,tv,1,max} = N^{SL}_{in,max}/2$.

$N^{SL}_{co,tv,1,max} = \left\lfloor N^{SL}_{in,max}/M_1 \right\rfloor$. For example, $M_1 = 2$, and correspondingly, $N^{SL}_{co,tv,1,max} = \left\lfloor N^{SL}_{in,max}/2 \right\rfloor$.

$N^{SL}_{co,tv,1,max} = \left\lceil N^{SL}_{in,max}/M_1 \right\rceil$. For example, $M_1 = 2$, -continued and correspondingly, $N_{co,tv,1,max}^{SL} = \left\lceil N_{in,max}^{SL}/2 \right\rceil$.

If $N_{in,max}^{SL} \bmod M_1 = 0$, then $N_{co,tv,1,max}^{SL} = N_{in,max}^{SL}/M_1$. For example, $$M_1 = 2,\ \text{and correspondingly,}$$

if $N_{in,max}^{SL} \bmod 2 = 0$ (or, if $N_{in,max}^{SL}$ is an even number), $$\text{then } N_{co,tv,1,max}^{SL} = N_{in,max}^{SL}/2.$$

If $N_{in,max}^{SL} \bmod M_1 \neq 0$, (or, if $N_{in,max}^{SL} \bmod M_1 > 0$), then $N_{co,tv,1,max}^{SL} = \left\lfloor N_{in,max}^{SL}/M_1 \right\rfloor$. For example, $M_1 = 2$, and correspondingly, if $N_{in,max}^{SL} \bmod 2 \neq 0$ (or, if $N_{in,max}^{SL} \bmod 2 > 0$, or if $N_{in,max}^{SL} \bmod 2 = 1$, or if $N_{in,max}^{SL}$ is an odd number), then $N_{co,tv,1,max}^{SL} = \left\lfloor N_{in,max}^{SL}/2 \right\rfloor.$ If $N_{in,max}^{SL} \bmod M_1 \neq 0$, (or, if $N_{in,max}^{SL} \bmod M_1 > 0$), then $N_{co,tv,1,max}^{SL} = \left\lfloor N_{in,max}^{SL}/M_1 \right\rfloor$. For example, $M_1 = 2$, and correspondingly, if $N_{in,max}^{SL} \bmod 2 \neq 0$ (or, if $N_{in,max}^{SL} \bmod 2 > 0$, or if $N_{in,max}^{SL} \bmod 2 = 1$, or if $N_{in,max}^{SL}$ is an odd number), then $N_{co,tv,1,max}^{SL} = \left\lfloor N_{in,max}^{SL}/2 \right\rfloor.$ Optionally, in Embodiment 1 of the present invention, $$N_{co,tv,2,max}^{SL}$$

may be determined in one of the following manners:
Optionally, $$N_{co,tv,2,max}^{SL}$$

is a predefined or configured or pre-configured constant. For example, $$N_{co,tv,2,max}^{SL} = 0.$$

As another example, $$N_{co,tv,2,max}^{SL} = 1.$$

As another example, $$N_{co,tv,2,max}^{SL} = 2.$$

As another example, $$N_{co,tv,2,max}^{SL} = 3.$$

As another example, $$N_{co,tv,2,max}^{SL} = 4.$$

As another example, $$N_{co,tv,2,max}^{SL} = 5.$$

As another example, $$N_{co,tv,2,max}^{SL} = 6.$$

If $N_{in,max}^{SL} \bmod M_1 = 0$, then $N_{co,tv,max}^{SL} = 0$. For example, $$M_1 = 2,\ \text{and correspondingly,}$$

if $N_{in,max}^{SL} \bmod 2 = 0$ (or, if $N_{in,max}^{SL}$ is an even number), $$\text{then } N_{co,tv,2,max}^{SL} = 0.$$

If $N_{in,max}^{SL} \bmod M_1 \neq 0$ (or, if $N_{in,max}^{SL} \bmod M_1 > 0$), then $N_{co,tv,2,max}^{SL} = \left\lceil \left( N_{in,max}^{SL} - \left\lfloor N_{in,max}^{SL}/M_1 \right\rfloor \cdot M_1 \right)/M_2 \right\rceil$. For example, $$M_1 = 2,\ M_2 = 1,\ \text{and correspondingly,}$$

if $N_{in,max}^{SL} \bmod 2 \neq 0$ (or if $N_{in,max}^{SL} \bmod 2 > 0$, or if $N_{in,max}^{SL} \bmod 2 = 1$, or if $N_{in,max}^{SL}$ is an odd number), then $N_{co,tv,2,max}^{SL} = \left\lceil \left( N_{in,max}^{SL} - \left\lfloor N_{in,max}^{SL} - \left\lfloor N_{in,max}^{SL}/2 \right\rfloor \cdot 2 \right\rfloor \right)/1 \right\rceil = 1.$ If $N_{in,max}^{SL} \bmod M_1 \neq 0$ (or, if $N_{in,max}^{SL} \bmod M_1 > 0$), then $N_{co,tv,2,max}^{SL} = \left\lceil \left( N_{in,max}^{SL} - \left\lfloor N_{in,max}^{SL}/M_1 \right\rfloor \cdot M_1 \right)/M_2 \right\rceil$. For example, $$M_1 = 2,\ M_2 = 1,\ \text{and correspondingly,}$$

if $N_{in,max}^{SL} \bmod 2 \neq 0$ (or if $N_{in,max}^{SL} \bmod 2 > 0$, or if $N_{in,max}^{SL} \bmod 2 = 1$, or if $N_{in,max}^{SL}$ is an odd number), then $N_{co,tv,2,max}^{SL} = \left\lceil \left( N_{in,max}^{SL} \bmod 2 \right)/1 \right\rceil = 1.$ Thus, according to Embodiment 1, provided in the present invention is a method in which slots in an input slot offset set are dynamically mapped to several time resource indication values, and a reference time is reset for each time resource indication value, thereby achieving flexible and efficient time resource indication in an inter-UE coordination message.

VARIANT EMBODIMENT

Hereinafter, FIG. 2 is used to illustrate user equipment that can perform the method performed by user equipment described in detail above in the present invention as a variant embodiment.

FIG. 2 shows a block diagram of user equipment (UE) according to the present invention.

As shown in FIG. 2, user equipment (UE) 20 includes a processor 201 and a memory 202. The processor 201 may include, for example, a microprocessor, a microcontroller, or an embedded processor. The memory 202 may include, for example, a volatile memory (for example, a random access memory (RAM)), a hard disk drive (HDD), a non-volatile memory (for example, a flash memory), or other memories. Program instructions are stored on the memory 202. The instructions, when run by the processor 201, can perform the above method performed by user equipment described in detail in the present invention.

The method and related equipment according to the present invention are described above in conjunction with preferred embodiments. A person skilled in the art could understand that the method shown above is only exemplary, and the above embodiments can be combined with one another as long as no contradiction arises. The method of the present invention is not limited to the steps or sequences illustrated above. The network nodes and user equipment illustrated above may include more modules. For example, the network nodes and user equipment may further include modules that can be developed or will be developed in the future to be applied to a base station, an AMF, a UPF, an MME, an S-GW, or UE, and the like. Various identifiers shown above are only exemplary, and are not meant for limiting the present invention. The present invention is not limited to the specific information elements serving as examples of these identifiers. A person skilled in the art could make various alterations and modifications according to the teachings of the illustrated embodiments. A person skilled in the art should understand that part or all of the mathematical expressions, mathematical equations, or mathematical inequalities may be simplified or transformed or rewritten to some extent, for example, incorporating constant terms, or interchanging two addition terms, or interchanging two multiplication terms, or moving a term from the left side of an equation or inequality to the right side after changing the plus or minus sign thereof, or moving a term from the right side of an equation or inequality to the left side after changing the plus or minus sign thereof, or the like. Mathematical expressions, mathematical equations, or mathematical inequalities before and after the simplification or transformation or rewriting can be considered to be equivalent to each other. A person skilled in the art would appreciate that a subset of a set may be the set itself. For example, a subset of $A=\{a_1, a_2\}$ may be $\{a_1, a_2\}$, or $\{a_1\}$, or $\{a_2\}$, or an empty set.

It is to be understood that the above-described embodiments of the present invention may be implemented by software or by hardware or by a combination of both software and hardware. For example, various components within the base station and the user equipment in the above embodiments may be implemented using a variety of devices including, but not limited to, analog circuit devices, digital circuit devices, digital signal processing (DSP) circuits, programmable processors, application-specific integrated circuits (ASICs), field programmable gate arrays (FPGAs), programmable logic devices (CPLDs), and the like.

In the present invention, the term "base station" may refer to a mobile communication data and/or control switching center having specific transmission power and a specific coverage area and including functions such as resource allocation and scheduling, data reception and transmission, and the like. The term "user equipment" may refer to a user mobile terminal, such as a terminal device that can perform wireless communication with a base station or a micro base station, including a mobile phone, a notebook, or the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above-described technical solutions of the present invention. When executed on at least one processor of a computing system, the computer program logic enables the processor to perform the operations (method) described in the embodiments of the present invention. Such an arrangement of the present invention is typically provided as software, codes and/or other data structures disposed on or encoded on a computer-readable medium such as an optical medium (such as a CD-ROM), a floppy disk, or a hard disk, or other media such as firmware or microcode on one or more ROM or RAM or PROM chips, or downloadable software images and shared databases in one or more modules, or the like. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, and the circuit is usually one or more integrated circuits. The circuits designed to execute the functions described in this description may include general-purpose processors, digital signal processors (DSPs), application-specific integrated circuits (ASICs) or general purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained by using this advanced technology.

Although the present invention has been illustrated in combination with the preferred embodiments of the present invention, a person skilled in the art should understand that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A method performed by a user equipment (UE), the method comprising:
   determining contents of a second-stage sidelink control information (SCI) format for indication of either a set of preferred resource(s) or a set of non-preferred resource(s), wherein:
   the second-stage SCI format indicates two time resource indicator values (TRIVs), and
   each TRIV indicates a number of slot(s) ($m_1$) that is less than or equal to two slots, each slot being indicated as a slot offset with respect to a reference slot of said TRIV, and
   the reference slot of a first TRIV of the two TRIVs is indicated in the second-stage SCI format; and
   transmitting the second-stage SCI format.

2. A user equipment, comprising:
   processor circuitry configured to determine contents of a second-stage sidelink control information (SCI) format for indication of either a set of preferred resource(s) or a set of non-preferred resource(s), wherein:
   the second-stage SCI format indicates two time resource indicator values (TRIVs), and each TRIV indicates a number of slot(s) ($m_1$) that is less than or equal to two slots, each slot being indicated as a slot offset with respect to a reference slot of said TRIV, and the reference slot of a first TRIV of the two TRIVs is indicated in the second-stage SCI format; and transmitting circuitry configured to transmit the second-stage SCI format.

3. A user equipment (UE) comprising:

receiving circuitry configured to:

receive a second-stage sidelink control information (SCI) format for indication of either a set of preferred resource(s) or a set of non-preferred resource(s), and obtain contents of the second-stage SCI format, wherein:

the second-stage SCI format indicates two time resource indicator values (TRIVs), and each TRIV indicates a number of slot(s) ($m_1$) that is less than or equal to two slots, each slot being indicated as a slot offset with respect to a reference slot of said TRIV, and the reference slot of a first TRIV of the two TRIVs is indicated in the second-stage SCI format.

* * * * *